(12) United States Patent
Ammari et al.

(10) Patent No.: US 12,423,229 B2
(45) Date of Patent: Sep. 23, 2025

(54) SYSTEMS AND METHODS FOR MEMORY REPRESENTATION AND TRACKING

(71) Applicant: Samsung Electronics Co., Ltd., Suwon-si (KR)

(72) Inventors: Ramzi Ammari, Santa Clara, CA (US); Mukesh Garg, Stanford, CA (US); Changho Choi, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 8 days.

(21) Appl. No.: 18/139,236

(22) Filed: Apr. 25, 2023

(65) Prior Publication Data

US 2024/0311297 A1    Sep. 19, 2024

Related U.S. Application Data

(60) Provisional application No. 63/452,610, filed on Mar. 16, 2023.

(51) Int. Cl.
  *G06F 12/08*    (2016.01)
(52) U.S. Cl.
  CPC .................................. *G06F 12/08* (2013.01)
(58) Field of Classification Search
  CPC ....................................................... G06F 12/08
  See application file for complete search history.

(56) References Cited

U.S. PATENT DOCUMENTS

| | | | |
|---|---|---|---|
| 6,330,572 B1 | 12/2001 | Sitka | |
| 7,529,903 B2 | 5/2009 | Boss et al. | |
| 8,683,125 B2 | 3/2014 | Chang et al. | |
| 8,712,984 B2 | 4/2014 | Zhang et al. | |
| 8,719,543 B2 | 5/2014 | Kaminski et al. | |
| 8,838,935 B2 | 9/2014 | Hinton et al. | |
| 9,141,527 B2 | 9/2015 | Atkisson et al. | |
| 9,176,864 B2 | 11/2015 | Gorobets et al. | |
| 9,478,274 B1 | 10/2016 | Michaud et al. | |
| 9,513,968 B1 | 12/2016 | Fiske et al. | |
| 9,652,376 B2 | 5/2017 | Kuzmin et al. | |

(Continued)

FOREIGN PATENT DOCUMENTS

| | | |
|---|---|---|
| CN | 114063894 A | 2/2022 |
| CN | 114840332 A | 8/2022 |
| WO | WO 2018/089085 A1 | 5/2018 |

OTHER PUBLICATIONS

EP Search Report for EP Application No. 24155799.0 dated Jun. 19, 2024, 11 pages.

(Continued)

*Primary Examiner* — Eric Cardwell
(74) *Attorney, Agent, or Firm* — Lewis Roca Rothgerber Christie LLP

(57) ABSTRACT

Systems and method for memory representation and tracking are disclosed. A storage system may identify a request to allocate memory in a first storage medium. In response to the request, the storage system may represent the memory via at least a first node of a first data structure. The first node may store first information for a first portion of the memory and a second portion of the memory. A criterion may be monitored for at least one of the first portion or the second portion. An order of the first node in the first data structure may be updated based on detecting the criterion.

20 Claims, 28 Drawing Sheets

(56) References Cited

U.S. PATENT DOCUMENTS

| | | | |
|---|---|---|---|
| 10,108,550 | B2 | 10/2018 | Coburn et al. |
| 10,509,731 | B1* | 12/2019 | Michaud ............. G06F 12/1009 |
| 10,996,863 | B1 | 5/2021 | Kuzmin et al. |
| 11,086,793 | B2 | 8/2021 | Kucherov et al. |
| 11,392,297 | B2 | 7/2022 | Yang et al. |
| 2005/0188248 | A1 | 8/2005 | O'Brien et al. |
| 2012/0023300 | A1 | 1/2012 | Tremaine et al. |
| 2012/0303878 | A1 | 11/2012 | Haas et al. |
| 2013/0138876 | A1 | 5/2013 | Wang |
| 2014/0115241 | A1 | 4/2014 | Wei |
| 2016/0055082 | A1 | 2/2016 | Kim et al. |
| 2017/0242583 | A1 | 8/2017 | Yang et al. |
| 2017/0336994 | A1* | 11/2017 | Jain ..................... G06F 12/1081 |
| 2018/0188980 | A1 | 7/2018 | Tai et al. |
| 2020/0133543 | A1 | 4/2020 | Singh |
| 2022/0091738 | A1 | 3/2022 | Patil et al. |
| 2022/0283954 | A1 | 9/2022 | Prasad et al. |
| 2022/0317925 | A1 | 10/2022 | Lepak |
| 2022/0318040 | A1 | 10/2022 | White et al. |
| 2022/0342568 | A1 | 10/2022 | Roberts |
| 2022/0374158 | A1 | 11/2022 | Yang et al. |

OTHER PUBLICATIONS

Wikipedia, "User Space and Kernel Space," https://en.wikipedia.org/w/index.php?title=User_space_and_kernel_space&oldid=1087757492, accessed May 6, 2024, 3 pages.

DePero, Matthew Michael, "Thread Safe Multi-Tier Priority Queue for Managing Pending Events in Multi-Threaded Discrete Event Simulations," 2018, https://etd.ohiolink.edu/apexprod/rws_olink/r/1501/10?clear=10&p10_accession_num=miami1535426621614915, 61 pages.

Gupta, Aayush et al., "DFTL: A Flash Translation Layer Employing Demand-based Selective Caching of Page-level Address Mappings," Acm Sigplan Notices 44.3, 2009, pp. 229-240.

Lee, Sungjin et al., "LAST: Locality-Aware Sector Translation for NAND Flash Memory-Based Storage Systems," ACM SIGOPS Operating Systems Review 42.6, 2008, pp. 36-42.

Sudan, Kshitij et al., "Micro-p. Increasing DRAM Efficiency with Locality-Aware Data Placement," ACM SIGARCH Computer Architecture News 38.1, 2010, pp. 219-230.

EPO Extended European Search Report dated Aug. 14, 2024, issued in corresponding European Patent Application No. 24159079.3 (9 pages).

\* cited by examiner

```
$alloc 100
$ Enter number of pages
$
found access on page [98], [97], [96], [95], [94], [93], [92], [91], [90], [89], [88], [87], [86], [85], [84], [83],
[73], [72], [71], [70], [69], [68], [67], [66], [65], [64], [63], [62], [61], [60], [59], [58], [57], [56], [55], [53],
[44], [42], [41], [40], [39], [38], [37], [36], [35], [34], [33], [32], [30], [29], [28], [27], [26], [25], [24], [23], [2
[13], [12], [11], [9], [7], [6], [5], [4], [3], [2], [1],           } 1200a
touch 3
$
found access on page [3], [3], [8], [0],   1200b
touch 5
$
found access on page [0], [9], [5], [4], [1], [10],   1200c
touch 7
$
found access on page [0], [1], [11], [7], [6], [2],   1200d
```

FIG. 12

```
Top tier HeatMap (top 10 chunks for demonstration)
|Chunk:4:   (25%)| => |Chunk:134: (00%)| => |Chunk:130: (00%)| => |Chunk:129: (00%)| => |Chunk:84: (00%)| => |Chunk:81: (00%)|
=> |Chunk:80: (00%)| => |Chunk:79: (00%)| => |Chunk:78: (00%)| => |Chunk:77: (00%)| => ......

Low tier HeatMap (top 10 chunks for demonstration)
|Chunk:134: (00%)| => |Chunk:130: (00%)| => |Chunk:129: (00%)| => |Chunk:73: (25%)| => |Chunk:84: (00%)|
=> |Chunk:81: (00%)| => |Chunk:80: (00%)| => |Chunk:79: (00%)| => |Chunk:78: (00%)| => ......

Monitoring ⌛
Stats
**************************************************
1400 —  Total allocated size         675840
1402 —  top_tier mapped pages        132
        low_tier mapped_pages        21
1404 —  High watermark               1000
        Low watermark                500
        Promote space                50
**************************************************

PROMOTE THREAD: ( pages in top tier [132], pages in low tier [21], [promote_count [21] )  — 1406

Stats
**************************************************
1408 —  Total allocated size         675840
        top tier mapped pages        153
        low_tier mapped_pages        0 ⇑
        High watermark               1000
        Low watermark                500
        Promote space                50
**************************************************
```

FIG. 14

SYSTEMS AND METHODS FOR MEMORY REPRESENTATION AND TRACKING

CROSS-REFERENCE TO RELATED APPLICATION(S)

The present application claims priority to and the benefit of U.S. Provisional Application No. 63/452,610, filed Mar. 16, 2023, entitled "MEMORY TIERING PAGE ACCESS TRACKING MECHANISM," the entire content of which is incorporated herein by reference. This application is also related U.S. application Ser. No. 18/139,211, filed Apr. 25, 2023, entitled "SYSTEMS AND METHODS FOR MEMORY REPRESENTATION AND MANAGEMENT," and is also related to U.S. Application Ser. No. 18/139,198, filed Apr. 25, 2023, entitled "SYSTEMS AND METHODS FOR MONITORING MEMORY ACCESSES," both filed on even date herewith, the contents of both of which are incorporated herein by reference.

FIELD

One or more aspects of embodiments according to the present disclosure relate to storage systems, and particularly to systems and methods for memory representation and tracking.

BACKGROUND

An application may interact with a storage system for reading and writing data. Latencies are generally involved in accessing the storage system. The type of latency involved my depend on the type of storage device included in the storage system. Certain storage devices have lower latencies than other storage devices. Thus, it may be desirable to store data in an appropriate data storage device for efficient data retrieval.

The above information disclosed in this Background section is only for enhancement of understanding of the background of the present disclosure, and therefore, it may contain information that does not form prior art.

SUMMARY

One or embodiments of the present disclosure are directed to a storage system that includes a first storage medium, a processor configured to communicate with the first storage medium, and a memory coupled to the processor. In some embodiments, the memory stores instructions that, when executed by the processor, cause the processor to: identify a request to allocate memory in the first storage medium, wherein the first storage medium is associated with a first tier of a memory hierarchy; in response to the request, represent the memory via at least a first node of a first data structure, wherein the first data structure is associated with the first tier; track activity associated with a memory address represented by the first node; update an order for the first node in the first data structure based on the activity; and move an association of the first node from the first data structure to a second data structure, wherein the second data structure is associated with a second tier of the memory hierarchy.

According to some embodiments, the second data structure is associated with a second storage medium.

According to some embodiments, the instructions further cause the processor to transmit a command for moving data stored in the memory address from the first storage medium to the second storage medium, based on moving the association of the first node from the first data structure to the second data structure.

According to some embodiments, the instructions further cause the process to select the first storage medium to allocate the memory based on preference associated with a process making the request.

According to some embodiments, the first node represents a first chunk of memory, wherein the first chunk is associated with a first page of memory and a second page of memory.

According to some embodiments, the first node stores a first bit for the first page for identifying whether first page is associated with the first tier or the second tier.

According to some embodiments, the instructions that cause the processor to track the activity comprise instructions that cause the processor to: identify access to at least one of the first page of memory or the second page of memory; and compute a percentage of memory pages identified as accessed.

According to some embodiments, the instructions executed by the processor are stored in a user space of the memory.

According to some embodiments, the processor is configured to move the association of the first node from the first data structure to the second data structure in response to detecting that a total number of pages represented by the first data structure exceeds a threshold number of pages.

According to some embodiments, the processor is configured to maintain a bit in memory for the memory address, wherein the bit indicates whether the memory address has been accessed.

One or more embodiments of the present disclosure are also directed to a method that includes identifying a request to allocate memory in a first storage medium. The first storage medium may be associated with a first tier of a memory hierarchy. The method includes representing the memory via at least a first node of a first data structure in response to the request. The first data structure may be associated with the first tier. Activity associated with a memory address represented by the first node may be tracked, and an order for the first node in the first data structure may be updated based on the activity. An association of the first node may be moved from the first data structure to a second data structure. The second data structure may be associated with a second tier of the memory hierarchy.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIG. 12 depicts a screen displaying a list of page numbers that have been accessed (e.g., touched), and for which access bits have been set according to one or more embodiments;

FIG. 14 depicts a screen displaying information about pages to be promoted from a low tier data structure to a top tier data structure according to one or more embodiments;

DETAILED DESCRIPTION

Figure 1:
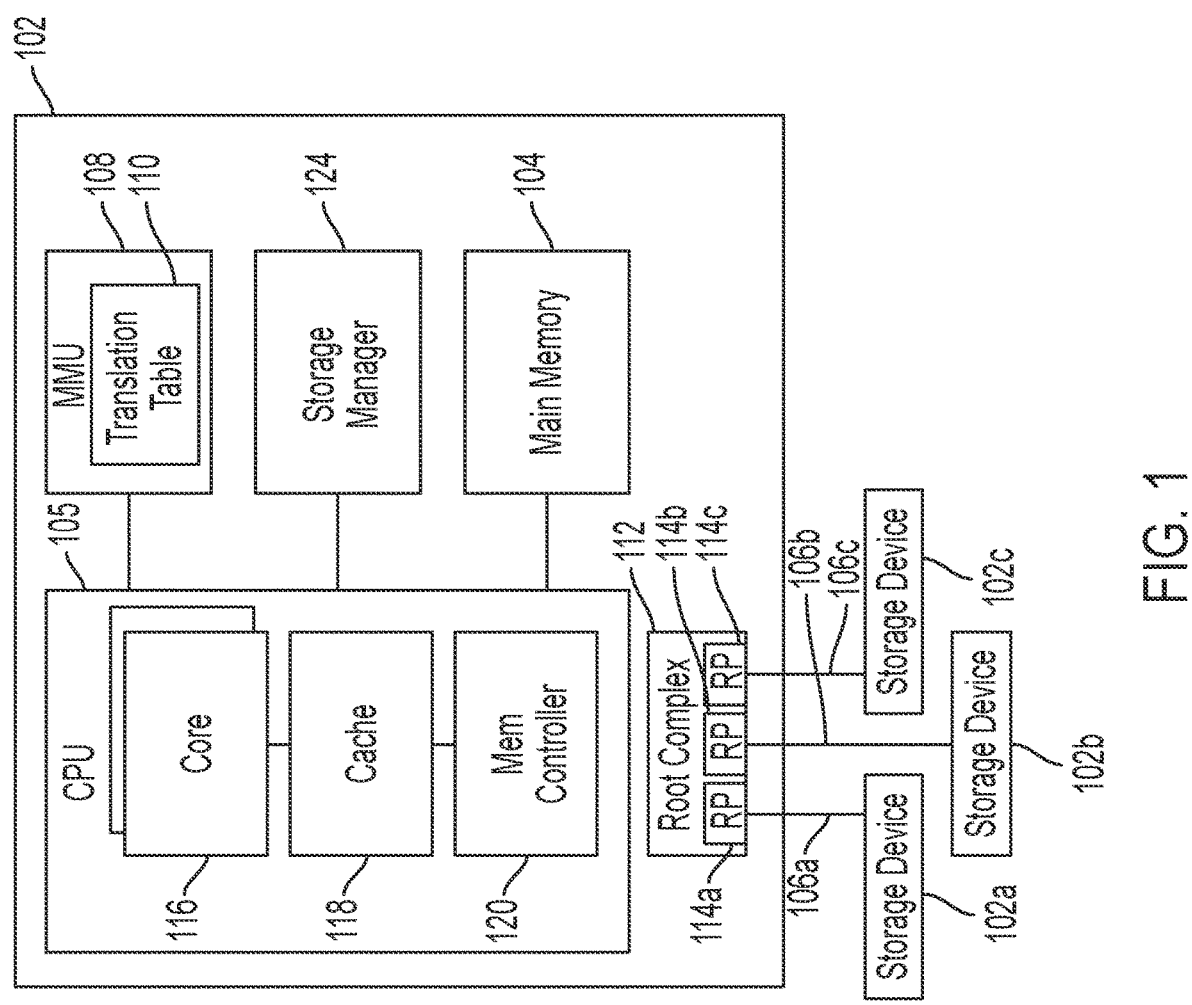
FIG. 1 depicts a block diagram of a system for memory representation and
  management according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

In general terms an application running on a host computing device may need to write and read data to and from a storage medium. Latencies are generally involved in accessing the storage medium. The latencies involved may differ depending on the type of storage medium that is accessed. For example, a storage medium (e.g., a dynamic random access memory (DRAM)) that is attached to a central computing unit (CPU) of the computing device may have lower latencies than a storage medium (e.g., a Compute Express Link (CXL) memory) that is attached over a data communications link. Although storage media like DRAM may offer lower latencies, they may also be expensive and provide limited capacities.

It may be desirable to have a storage system with different types of memory (e.g., a combination of DRAM and CXL memory) that are arranged in a memory hierarchy or tier, where the tier assigned to a storage medium may be based on a characteristic (e.g., latency) of the storage medium. Taking latency as an example, the tier assigned to the storage medium may increase as the latency associated with the medium decreases. The tiered memory system may allow data to be distributed in such a way that a block, chunk, or page of data (collectively referred to as a "page" or "memory page") that is accessed more often than other memory pages is stored in (or promoted to) a higher memory tier (e.g., DRAM), and a memory page that is accessed infrequently is stored in (or demoted to) a lower memory tier (e.g., CXL memory).

Embodiments of the present disclosure are directed to systems and methods for representing an application memory space and managing storage of data for the application via memory tiering operations. The memory tiering operations may include memory allocation based on hardware topology or user configuration preferences for the application, generating representations of the memory allocations, tracking memory accesses, reordering the representations of the memory allocations based on the tracking, and/or making memory migration decisions. In some embodiments, the memory tiering operations are performed on a per application (or process) basis.

In some embodiments, the memory tiers and related memory tiering operations are implemented in a user space (as opposed to a kernel space), in a manner that is transparent to the application in terms of performance and application code. Some benefits of configuring and managing the memory tiers in the user space include, without limitation: 1) application of memory tiering to selected processes or virtual machines (VMs), allowing customization of the memory tiering based on requirements of the processes or VMs; 2) better user space control; 3) configuration of memory tiers after kernel bootup on a per-process basis; and 4) relative ease of making changes (e.g., of the memory tiers) in the user space (e.g., does not require permissions), than the kernel space.

In some embodiments, instructions for the memory tiering operations are included in a programming library such as a memory tiering library that may be loaded prior to a memory allocation library. The memory tiering library may be configured to intercept memory allocation requests for an application, and store memory allocation information in one or more data structures. The storage medium selected for the memory allocations may depend on the requirements and/or preferences (collectively referred to as preferences) identified for the application. In some embodiments, a first data structure may represent (or map) memory allocated in a first storage medium in a first memory tier, and a second data structure may represent memory allocated in a second storage medium in a second memory tier. The first memory tier may be higher than the second memory tier.

In some embodiments, the nodes of the first and second data structures may represent one or more memory pages in the corresponding storage medium. The nodes may be used for tracking access of the one or more pages by the application. In this regard, a page tracking process or thread may track page activity (or activeness) information, including when a page is accessed and/or a number of accesses, and reorder the corresponding nodes based on the tracked information. For example, a node corresponding to one or more active or hot pages may be moved to a top or head of the data structure, and a node corresponding to one or more inactive or cold pages may be moved to a bottom or tail of the data structure.

In some embodiments, a hot page at a head of the second data structure may further be promoted to the first data structure, and/or a cold page at a tail of the first data structure may be demoted to the second data structure. The physical memory pages that correspond to the migrated nodes may also be promoted or demoted based on the promotion or demotion of the corresponding nodes.

FIG. 1 depicts a block diagram of a system for memory representation and management according to one or more embodiments. The system includes a host computing device (referred to as the "host") 100 coupled to a one or more endpoints such as, for example, one or more storage or memory devices 102a-102c (collectively referenced as "storage devices" 102).

The host 100 includes a processor 105, main memory 104, memory management unit (MMU) 108, and root complex (RC) interface 112. The processor 105 may include one or more central processing unit (CPU) cores 116 configured to execute computer program instructions and process data stored in a cache memory 118 (also simply referred to as "memory" or "cache"). The cache 118 may be dedicated to one of the CPU cores 116 or shared by various ones of the CPU cores.

The cache 118 may be coupled to a memory controller 120 which in turn is coupled to the main memory 104. The main memory 104 may include, for example, a dynamic random access memory (DRAM) storing computer program instructions and/or data (collectively referenced as data) used by a process executed by a core 116. The data may be loaded into the cache memory 118, and the process may consume the data directly from the cache memory. If the data to be consumed is not already in the cache, the process may need to query other memory devices in the memory hierarchy to find the data. For example, if the data that is sought is not in the cache 118, the process may query main memory 104, and if not in the main memory 104, query the storage device 102.

In some embodiments, the cache 118, main memory 104, and/or storage devices 102 may be included in a memory system that allows memory tiering to deliver an appropriate cost or performance profile. In this regard, the different types of storage media may be organized in the memory hierarchy or tier based on a characteristic of the storage media. The characteristic may be access latency. In some embodiments, the tier or level of a storage medium increases as the access latency decreases.

In some embodiments, the one or more of the storage devices 102 are storage devices of the same or different type, that are aggregated into a storage pool. For example, the storage pool may include one or more CXL memory devices and one or more SSDs. The tier of one type of storage device in the pool (e.g., CXL memory devices) may be higher than the tier of another type of storage device (e.g., SSDs) in the pool.

In some embodiments, the host 100 may support one or more virtual machines (VMs) that may have its own instance of the processor 105, MMU 108, and/or machine memory 104. One of the one or more VMs may execute a process or application such as, for example, a big data analysis application, e-commerce application, database application, machine learning application, and/or the like. In some embodiments, a first VM executes a first process concurrently with a second process executed by a second VM.

In some embodiments, the host 100 includes a storage or memory manager 124 for implementing memory allocation and tiering operations for one or more applications. The storage manager 124 may be implemented via hardware, firmware (e.g., via an application-specific integrated circuit (ASIC)), software, or any combination of software, firmware and/or hardware. For example, the storage (or memory) manager 124 may be implemented as a memory tier programming library that is loaded by an application (e.g., at runtime). In some embodiments, the memory tiering library is loaded prior to the loading of other libraries, such as a memory allocation library.

In some embodiments, the storage manager 124 is configured to identify memory allocation requests by the application, and store the memory allocation requests in a queue. The memory allocation requests may also proceed through for execution. In this regard, memory may be allocated in the main memory 104 or in one of the storage devices 102 in response to the allocation request. The selection of the storage medium where the memory is to be allocated may be based on preferences identified for the application.

In some embodiments, the storage manager 124 dequeues the queued memory allocation requests, and generates one or more nodes that represent the memory allocation. The generated nodes may be stored in one or more data structures such as, for example, one or more linked lists. For example, the nodes in a first data structure may represent (also generally referred to as contain) memory pages stored in a first storage medium (e.g., the main memory 104) that is assigned a first (e.g., top or fast) memory tier. The nodes in a second data structure may represent memory pages stored in a second storage medium (e.g., the storage device 102) that is assigned a second (e.g., low or slow) memory tier.

In some embodiments, the storage manager 124 is configured to check activeness of a page represented by a node. Activeness information for a page may indicate whether the page has been accessed (e.g., is a "hot" page), or not (e.g., is a "cold" page). In some embodiments, activeness information of a page indicates a number of accesses of the page. The number of accesses may be maintained by the storage media (e.g., storage device 102) using a counter, and provided to the storage manager 124 in response to a host command, as described in further detail in U.S. application entitled "Systems and Methods for Monitoring Memory Accesses," filed on even date herewith, the content of which is incorporated herein by reference.

In some embodiments, the storage manager 124 rearranges the nodes in the data structure in response to the page activeness information. For example, a node with one or more hot pages may be moved to a head of the data structure, and a node with one or more cold pages may be moved to a tail of the data structure. Page migration (e.g., promotion or demotion) decisions may also be made on a periodic (regular or irregular) basis. For example, a node representing a first page at the tail of the first (top tier) data structure may be moved (e.g., demoted) to the tail of the second (low tier) data structure, and/or a node representing a second page at the head of the second (low tier) data structure may be moved (e.g., promoted) to the head of the first (top tier) data structure. Promotion and/or demotion decisions may be based on a comparison of a current number of pages in a tier as compared to a threshold number of allowed pages.

In some embodiments, the processor 105 (e.g., an application executed by a VM) generates requests for a storage device 102. The requests may include requests to read/load data, write/store data, erase/flush data, and/or the like. One or more of the requests may be associated with a virtual memory address. In some embodiments, the processor may invoke the MMU 108 to translate a virtual address to a physical address. The MMU 108 may include a translation table 110 that maps the virtual address to the physical address. The request transmitted to the storage device 102 may include the physical address corresponding to the virtual address.

In some embodiments, the processor 105 sends requests to the storage device 102 via the RC interface 112 and interface connections 106a-106c (collectively referenced as 106). The requests may include data access requests, memory count information requests, and/or the like. Messages from the storage device 102 to the processor 105, such as, for example, responses to the requests from the processor 105t, are delivered over the interface connections 106 to the RC interface 112, which in turn delivers the responses to the processor 105.

In some embodiments, the interface connections 106 (e.g., the connector and the protocol thereof) includes various general-purpose interfaces such as, for example, Ethernet, Universal Serial Bus (USB), and/or the like. In some embodiments, the interface connections 106 (e.g., the connector and the protocol thereof) may include (or may conform to) a Compute Express Link (CXL), Cache Coherent Interconnect for Accelerators (CCIX), dual in-line memory module (DIMM) interface, Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), iWARP protocol, InfiniBand protocol, 5G wireless protocol, Wi-Fi protocol, Bluetooth protocol, and/or the like.

The RC interface 112 may be, for example, a PCIe interface configured to implement a root complex for connecting the processor 105 and the host main memory 104 to the storage devices 102. The RC interface 112 may include one or more ports 114a-114c to connect the one or more storage devices 102 to the RC. In some embodiments, the MMU 108 and/or translation table 110 may be integrated into the RC 112 interface for allowing the address translations to be implemented by the RC interface.

The storage device 102 may include one or more of a volatile computer-readable storage medium and/or non-volatile computer-readable storage medium. In some embodiments, one or more of the storage devices 102 include any type of memory that is attached to a CPU or GPU, such as, for example, a CXL attached memory device (including volatile and persistent memory device), RDMA attached memory device, and/or the like, although embodiments are not limited thereto. The CXL attached memory device (simply referred to as CXL memory) may adhere to a CXL.mem protocol where the host 100 may access the device using commands such as load and store commands. In this regard, the host 100 may act as a requester and the CXL memory may act as a subordinate.

In some embodiments, one or more of the storage devices 102 may also include volatile computer-readable storage medium such as random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like.

The one or more storage devices 102 may include non-volatile computer-readable storage medium such as a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

Figure 2:
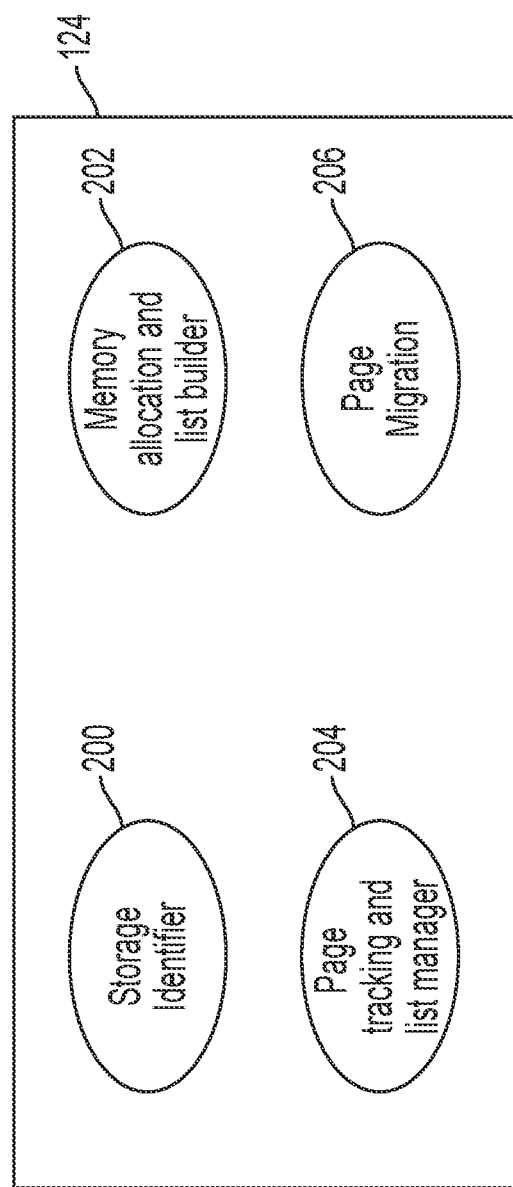
FIG. 2 depicts a block diagram of a storage manager according to one or more embodiments.

FIG. 2 depicts a block diagram of the storage manager 124 according to one or more embodiments. In some embodiments, the storage manager 124 is configured to be executed in a user space of the main memory 104. The execution in the user space may allow memory allocation and tiering operations to be customized a per-process basis. In some embodiments, the storage manager 124 is invoked for memory allocation and tiering for a first application, while the storage manager 124 is not invoked for a second application. Thus, the second application may not get the benefit of memory tiering as the first application.

In some embodiments, the storage manager 124 includes a storage identifier module 200, memory allocation and list builder module 202, page tracking and list management module 204, and page migration module 206. The one or more modules 200-206 may be executed concurrently via one or more processing threads. Also, although the one or more modules 200-206 may be implemented as separate functional units, a person of skill in the art will recognize that the functionality of the modules may be combined or integrated into a single module, or further subdivided into further sub-modules without departing from the spirit and scope of the inventive concept.

In some embodiments, the storage identifier module 200 is configured to identify a storage medium based on preferences and/or requirements (collectively referred to as preferences) of the application for which memory is to be allocated. Application preferences may be stored, for example, in a configuration file associated with the application. The configuration file may identify a preferred storage parameter among one or more storage parameters including bandwidth, latency, capacity, and/or the like.

In some embodiments, the storage identifier module 200 gathers information of one or more storage media (e.g., the main memory 104 and/or storage devices 102) available to the application. The gathered information may correspond to the storage parameters in the configuration file. For example, the storage identifier module 200 may gather capacity, bandwidth, and latency attributes for the identified storage media. The storage identifier module 200 may select one of the identified storage media based on the preference information in the configuration file, and the storage parameters of the identified storage media.

For example, if a first application identifies a preference for bandwidth, the storage identifier module 200 identifies a storage medium that provides a best bandwidth among the identified storage media. In another example, a second application may identify a preference for storage capacity, and the storage identifier module 200 may identify a storage medium that provides a best storage capacity among the identified storage media. In some embodiments, if no configuration file is provided for the application, the storage identifier module 200 may select a default storage medium, such as one that is closest to the processor 105.

The memory allocation and list builder module 202 is configured to intercept memory allocation requests by the application, and store the requests in a queue. The memory allocation may proceed as requested by the application. In executing the request, a memory corresponding to the requested size may be allocated in the storage medium identified by the storage identifier module 200.

In some embodiments, the memory allocation and list builder module 202 retrieves the memory requests from the queue, and generates one or more nodes representing the allocated memory. In some embodiments, a node corresponds to one page of allocated memory. In some embodiments, a node corresponds to more two or more pages. The generated nodes may be stored in a data structure such as, for example, a linked list. The data structure may identify or be associated with the memory tier of the data structure selected for the allocation.

The page tracking and list manager module 204 may be invoked from time to time to track page activity data and manage the data structure based on activeness of the pages. For example, the module 204 may traverse the nodes of the data structure for retrieving activeness information of one or more pages represented by the nodes. In this regard, the module 204 may search for the virtual address of a page in the translation table 110, and retrieve an access bit for the page. In some embodiments, the page is deemed to be hot if the access bit has been set. If the access bit has not been set, the page may be deemed to be cold.

The page access information may be used to rearrange the nodes in the data structure. In some embodiments, the nodes are arranged from active to inactive so that nodes identified as active are placed at a head of the data structure, and nodes identified as inactive are placed at a tail of the data structure. In some embodiments, the nodes are arranged based on an extent of activeness (e.g., number of accesses) of the one or more pages represented by the nodes.

The page migration module 206 may be configured to make memory migration decisions based on activeness of pages represented by the data structures, and further based on set thresholds. In some embodiments, page migration decisions are triggered based on a comparison of a current number of pages represented by the nodes of the data structure, against a threshold value. For example, the page migration module 206 may determine that the number of pages mapped to a first (top) data structure exceeds a maximum threshold number, and demote one or more pages represented by one or more nodes at a tail of the first data structure, to a second (low) data structure, in order to not exceed the maximum threshold number. In another example, the page migration module 206 may determine that the number of pages mapped to the top data structure is below a minimum threshold number, and promote one or more pages represented by one or more nodes at a head of the low data structure, to the top data structure, in order to satisfy the minimum threshold number.

In some embodiments, the page migration module 206 supports a page locking feature for one or more applications. For example, an application may indicate (e.g., in the configuration file), that a certain percentage of pages (e.g., 50%) are to stay locked in a fast tier memory and not be demoted to a low tier memory. The page migration module 206 may identify activeness of the pages in the fast tier memory, and lock the indicated percentage of most active pages. The remaining pages in the fast tier may be deemed to be unlocked, and eligible to be demoted to the low tier memory.

In some embodiments, in response to the migration of a page (which should be understood to mean a representation of the page in the node) from one data structure or tier to another, the page migration module 206 transmits a signal to the corresponding storage media for physically moving the corresponding page from one storage medium to another. The physical movement of pages may be carried out via one or more read/load and write/store commands by the page migration module 206 to the storage media.

Figure 3:
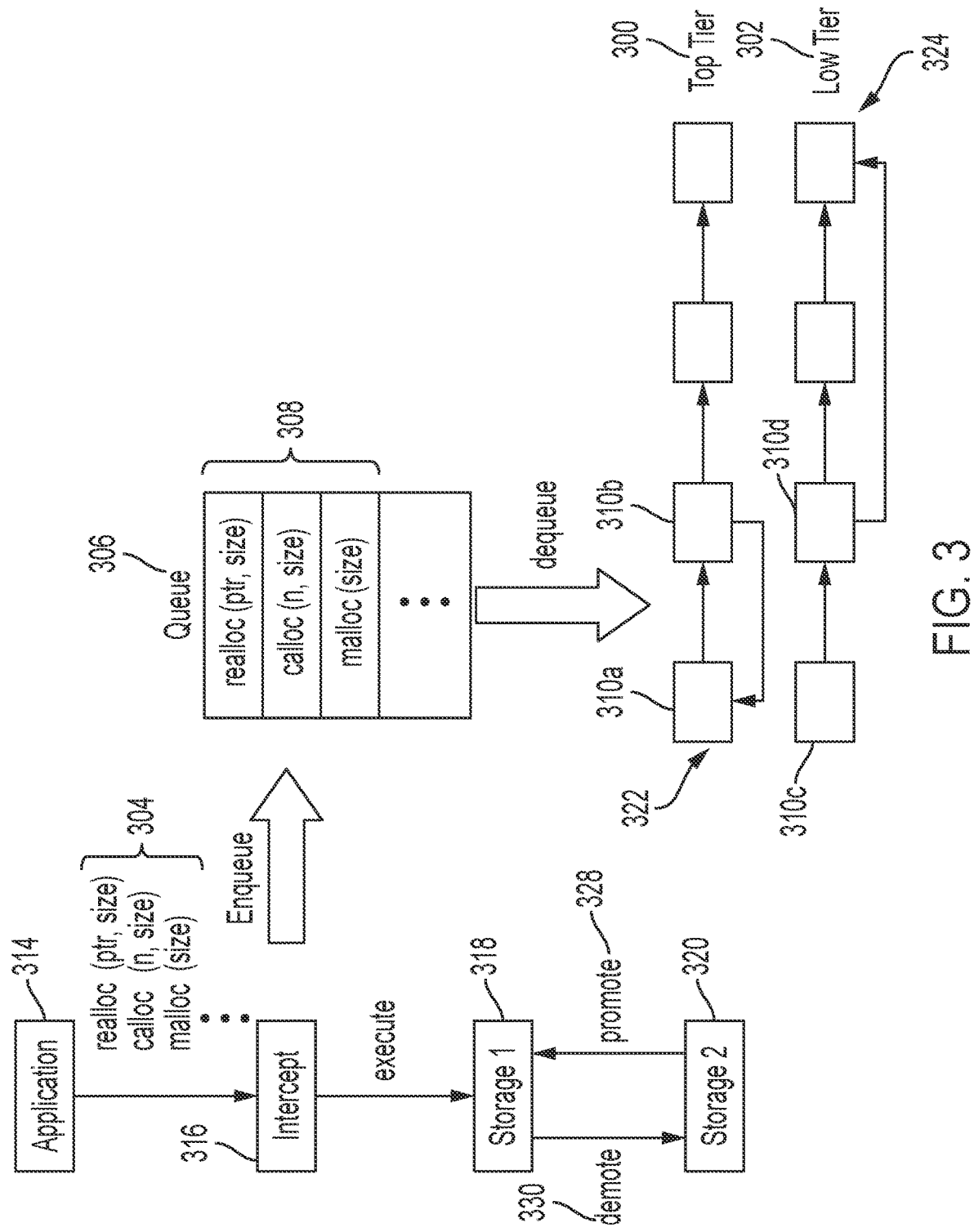
FIG. 3 depicts a conceptual layout diagram of components involved in a memory allocation and allocation representation according to one or more embodiments.

FIG. 3 depicts a conceptual layout diagram of components involved in the memory allocation and allocation representation according to one or more embodiments. An application 314 executed by the processor 105 (or a VM hosted by the processor 105) may make one or more memory allocation requests 304. a memory allocation request may include, for example, a size of the requested memory.

In some embodiments, the storage manager 124 (e.g., via the memory allocation and list builder module 202) intercepts (or identifies) 316 a memory allocation request 304, and stores the request in a queue 306. In some embodiments, the memory allocation and list builder module 202 represents the memory allocation via a top tier data structure 300 and/or a low tier data structure 302. In this regard, the memory allocation and list builder module 202 dequeues a queue entry 308 from the queue 306, and generates at least a first node 310*a* in the top tier data structure 300, and/or at least a second node 310*c* in the low tier data structure 302. The selection of the tier may depend on the preference identified for the application. Although the embodiment of FIG. 3 includes two data structures 300, 302, additional data structures corresponding to other types of storage media may also be generated as will be appreciated by a person of skill in the art.

In one embodiment, one node 310*a*-310*d* (collectively referenced as 310) of the data structure 300, 302, represents one memory page. In this embodiment, the node 310 stores information associated with the corresponding memory page. The information may include, for example, a virtual address and size of the memory page. In the embodiment where the data structure 300, 302 is a linked list, the node (e.g., node 310*a*) may further include a pointer to a next (neighboring) node (e.g., node 310*b*).

In some embodiments, the processor 105 executes the memory allocation requests, and allocates the requested memory in a first storage medium 318 and/or second storage medium 320. Selection of the storage medium may be based on preferences identified for the application 314 (e.g., by the storage identifier module 200).

In some embodiments, memory page accesses are tracked, and the nodes 310 of the data structure 300, 302 may be reorganized based on the accesses. In this regard, the data structures 300, 302 may be implemented as least recently used (LRU) lists. For example, a node (e.g., node 310*b*) in one of the data structures (e.g. the top tier data structure 300) may move from a current location to a head 322 of the same data structure based on activeness of the memory page represented by the node 310*b*. In another example, a node (e.g., node 310*d*) in one of the data structures (e.g., the low tier data structure 302) may move from a current location towards a tail 324 of the same data structure based on lack of activeness of the memory page represented by the node 310*d*.

In some embodiments, a node (which should be understood to mean a page represented by the node) may be promoted from the low tier data structure 302 to the top tier data structure 300, or demoted from the top tier data structure to the low tier data structure. Promotion and demotion may be based on maximum and/or minimum threshold numbers of pages set for the tier (e.g., the top tier). In response to the promotion and/or demotion of nodes 310 between the data structures 300, 302, the physical memory pages that correspond to the migrated pages are also promoted 328 and/or demoted 330 between the first and second storage media 318, 320.

Figure 4:
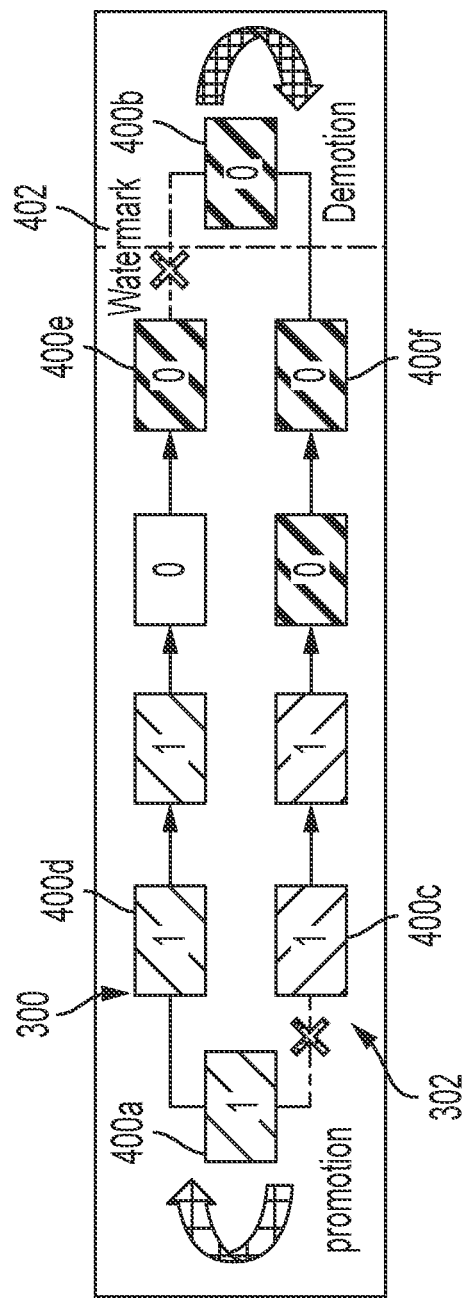
FIG. 4 depicts a conceptual layout diagram of migration of one or more pages represented by nodes according to one or more embodiments.

FIG. 4 depicts a conceptual layout diagram of migration of one or more pages represented by nodes 400*a*, 400*b* according to one or more embodiments. In the example of FIG. 4, the term node and memory page may be used interchangeably as one node corresponds to one memory page. The promotion and demotion decision may be based on the activity (e.g., hotness or coldness) that is tracked for the corresponding memory page.

In some embodiments, the promotion or demotion of a node includes, for example, removing the node from one tier and inserting the node in the other tier (e.g., by removing and reconnecting pointers or links from/to neighboring nodes). In some embodiments, the number and nodes (which should be understood to mean pages represented by the nodes) that are selected for demotion from the top tier data structure 300 to the low tier data structure 302 may depend, for example, on a threshold value 402. The threshold value 402 may be a maximum number of pages that are to be stored in the top tier. In the example of FIG. 4, the promotion of a hot page (e.g., node 400*a*) to the top tier data structure 300 may cause the total number of nodes/pages to exceed the threshold value 402. In this case, one or more cold pages (e.g., node 400b) at the tail of the top tier data structure 300 may be selected for demotion to the low tier data structure 302.

In promoting node 400a to the top tier data structure 300, the pointer to a next node 400c maintained in node 400a may be changed to identify node 400d. In demoting node 400b from the top tier data structure 300 to the low tier data structure 302, a pointer to node 400b that is maintained in node 400e may be removed, and a pointer to node 400b in node 400f may be added.

Figure 5:
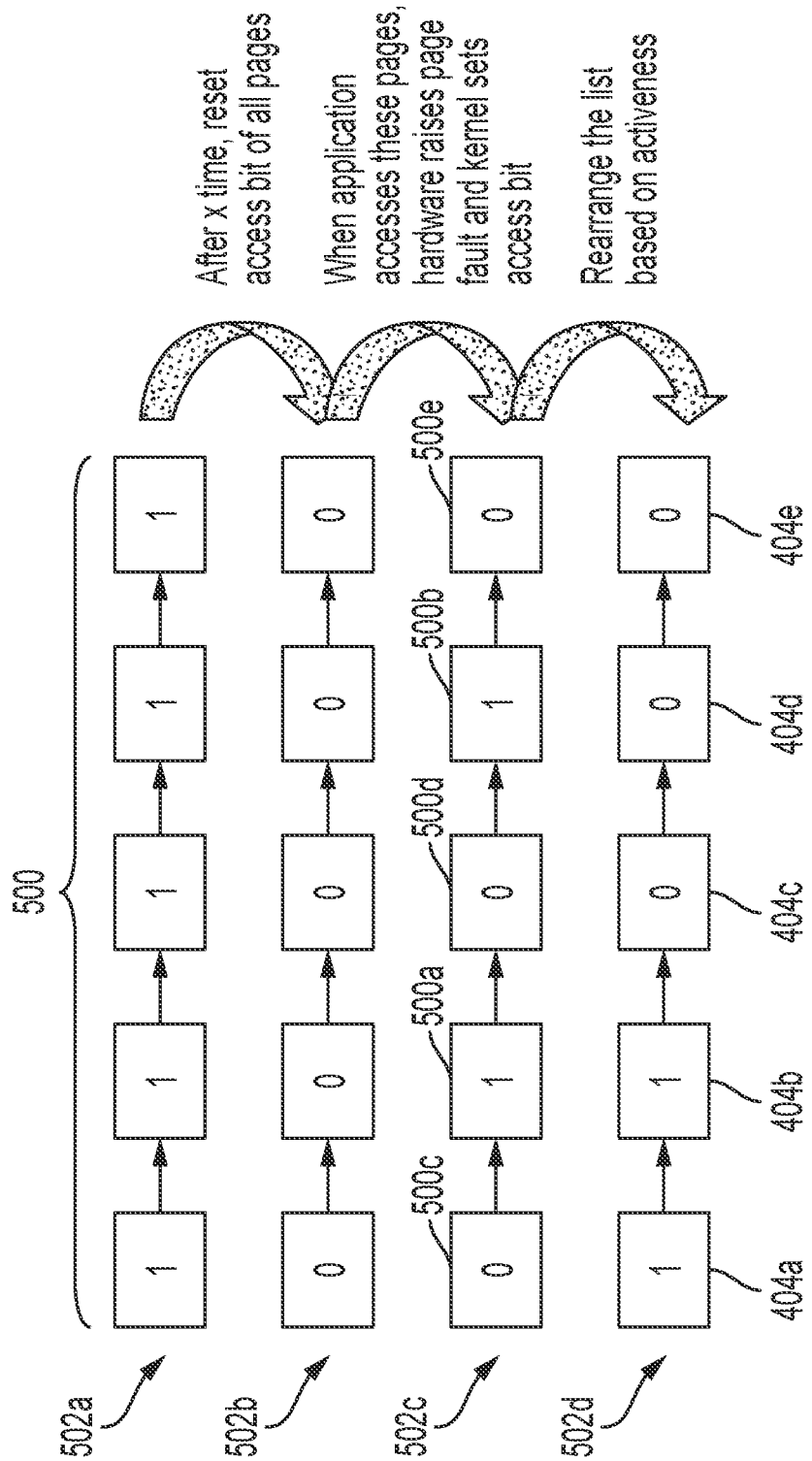
FIG. 5 depicts a conceptual layout diagram of nodes of a data structure in different states according to one or more embodiments.

FIG. 5 depicts a conceptual layout diagram of nodes 500 of a data structure (e.g., data structure 300, 302) in different states 502a-502d according to one or more embodiments. In some embodiments, an access bit is maintained (e.g., in the MMU 108) for an address of a memory page represented by the node. The page tracking and list manager module 204 may retrieve the access bit periodically for determining whether a page is hot (access bit is "1") or cold (access bit is "0").

In state 502a, the access bits of the pages represented by the data structure is set to "1." After a period of time, in state 502b, the access bits for the pages are reset to "0."

In state 502c, the application may request access to one or more memory pages. The MMU 108 may be invoked for retrieving the access bit for the requested memory page. A page fault may be raised in response to the access bit being "0," and the access bit may be set to "1" in response to the page fault. In the example of FIG. 5, nodes 500a and 500b represent pages with access bits set to "1," and nodes 500c, 500d, and 500e represent pages with access bits set to "0."

In state 502d, the page tracking and list manager module 204 may reorganize the nodes based on the activeness of the represented pages. For example, nodes associated with hot pages (e.g., nodes 500a, 500b) may be moved to a head of the data structure, and nodes 500c-500e may be moved (or remain), at a tail of the data structure.

Figure 6:
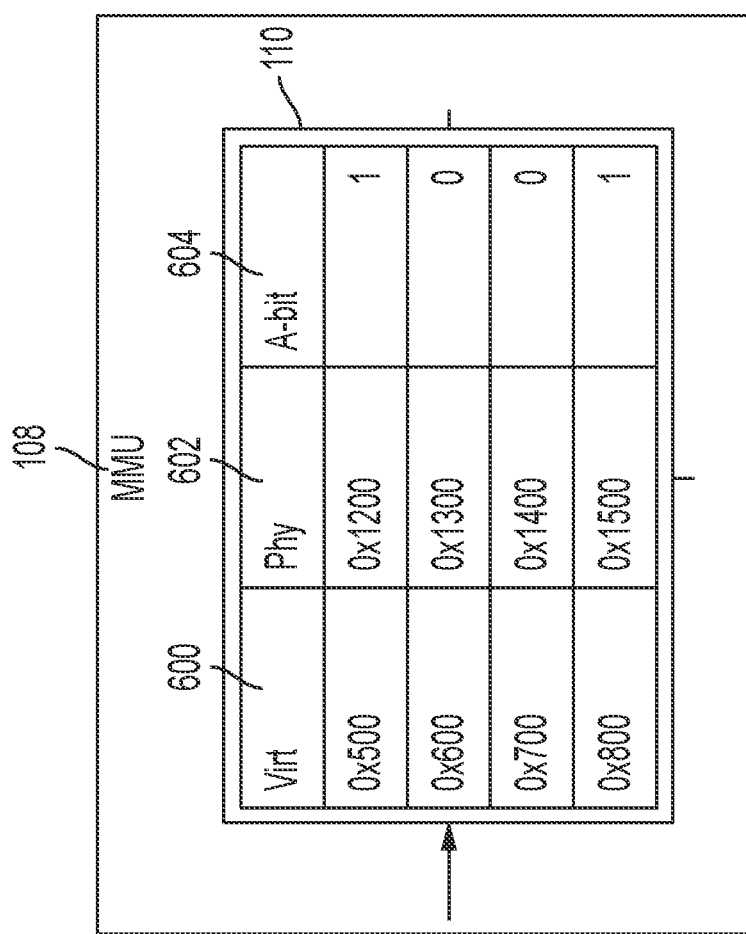
FIG. 6 depicts a conceptual layout diagram of a translation table maintained by a memory management unit according to one or more embodiments.

FIG. 6 depicts a conceptual layout diagram of the translation table 110 maintained by the MMU 108 according to one or more embodiments. The translation table 110 stores a translation of virtual addresses 600 to physical memory addresses 602. In some embodiments, the translation table 110 stores an access bit 604 in association with the virtual and physical memory addresses. A read/load or write/store request by an application for a page with an access bit set to a value of "0" may trigger a page fault. The access bit 604 for the requested memory address may be set to "1" in response to the triggering of the page fault. The processor 105 may cause the access bits 604 to be reset to "0" on a periodic basis.

In some embodiments, the page tracking and list manager module 204 periodically reads the access bits 604 for determining activeness of memory pages associated with the memory addresses 600, 602. The module 204 may flag a page as hot in response to the access bit for the page having a value of "1." The module may flag the page as cold in response to the access bit for the page having a value of "0."

Figure 7:
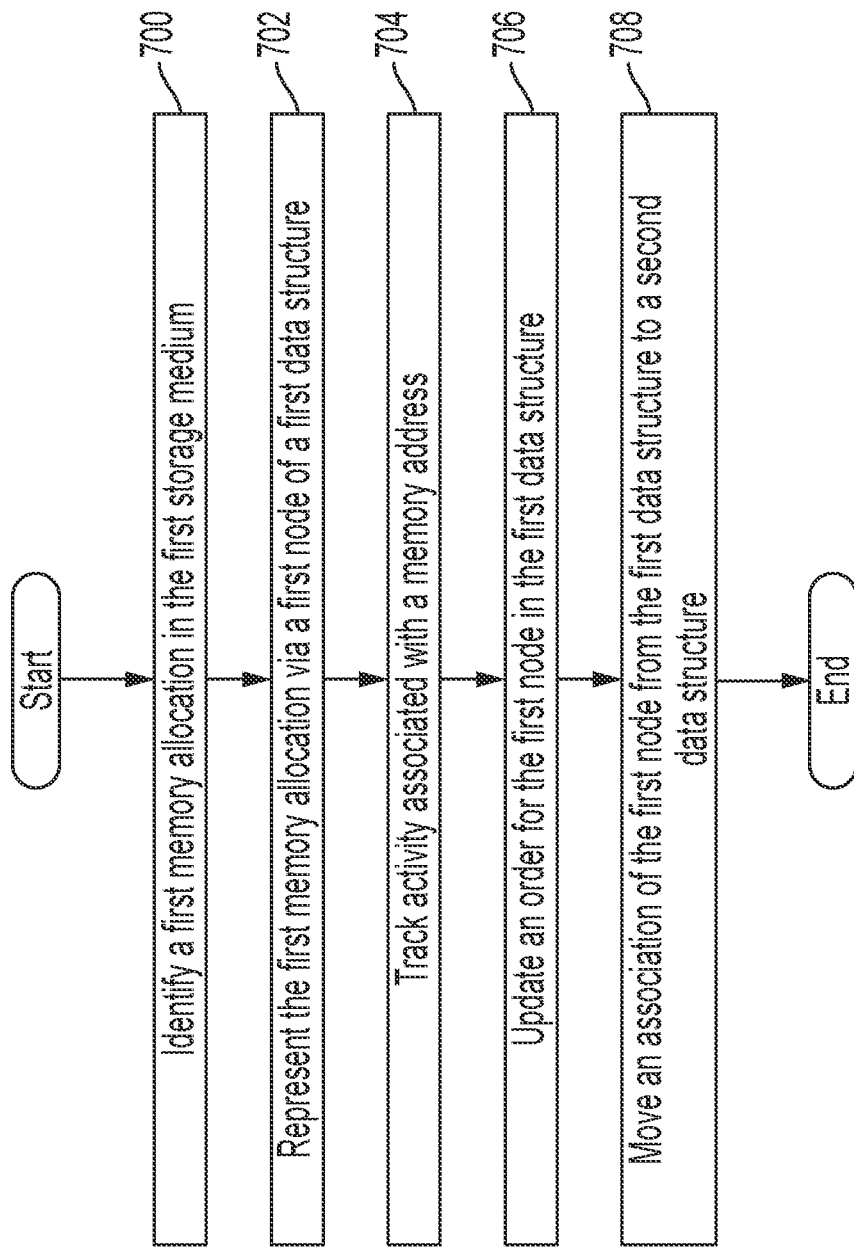
FIG. 7 depicts a flow diagram of a process for performing memory tiering operations according to one or more embodiments.

FIG. 7 depicts a flow diagram of a process for performing memory tiering operations according to one or more embodiments. In act 700, the storage manager 124 (e.g., via the memory allocation and list builder module 202) identifies a first memory allocation. For example, the storage manager 124 may intercept a memory allocation request by an application and store the request in a queue (e.g., queue 306).

In act 702, the storage manager 124 may represent the memory allocation via a first node of a first data structure associated with a first tier of a memory hierarchy (e.g., the top tier data structure 300). Selection of the data structure (and the associated memory tier) may be based on preferences set for the application.

In act 704 the storage manager 124 (e.g., the page tracking and list manager module 204) may track activeness of the allocated memory address. Activity tracking may be for a page of memory identified by the memory address. In some embodiments, the storage manager 124 retrieves an access bit associated with the memory address for determining activeness of the page. In some embodiments, the page is identified as "hot" in response to the access bit being set to "1," and "cold" in response to the access bit being set to "0." In some embodiments page activeness information is provided by the storage devices 102. In this regard, the storage devices 102 maintain a counter that is incremented for a memory address in response to detecting access to the memory address. The counter value may be provided to the storage manager 124 upon request, and used for determining activeness of the page.

In act 706, the storage manager 124 updates an ordering of the first node in the first data structure based on the retrieved activeness information. For example, a node representing a hot page may be moved to the head of the first data structure, and a node representing a cold page may be moved to the tail of the first data structure. In the embodiments where the activeness information includes a number of accesses, the nodes may be organized in decreasing order based on the number of accesses, where the node representing a page with the most number of accesses is placed at the head of the first data structure, and the node representing a page with the least number of accesses is placed at the tail of the first data structure.

In act 708, the storage manager 124 (e.g., via the page migration module 206) may determine that a page migration trigger has been satisfied, and move an association of the first node from the first data structure to a second data structure. The second data structure may be associated with a second tier of the memory hierarchy. For example, the page migration trigger may be satisfied in response to detecting that a total number of pages represented by the first data structure exceeds a threshold maximum number of pages.

Figure 8:
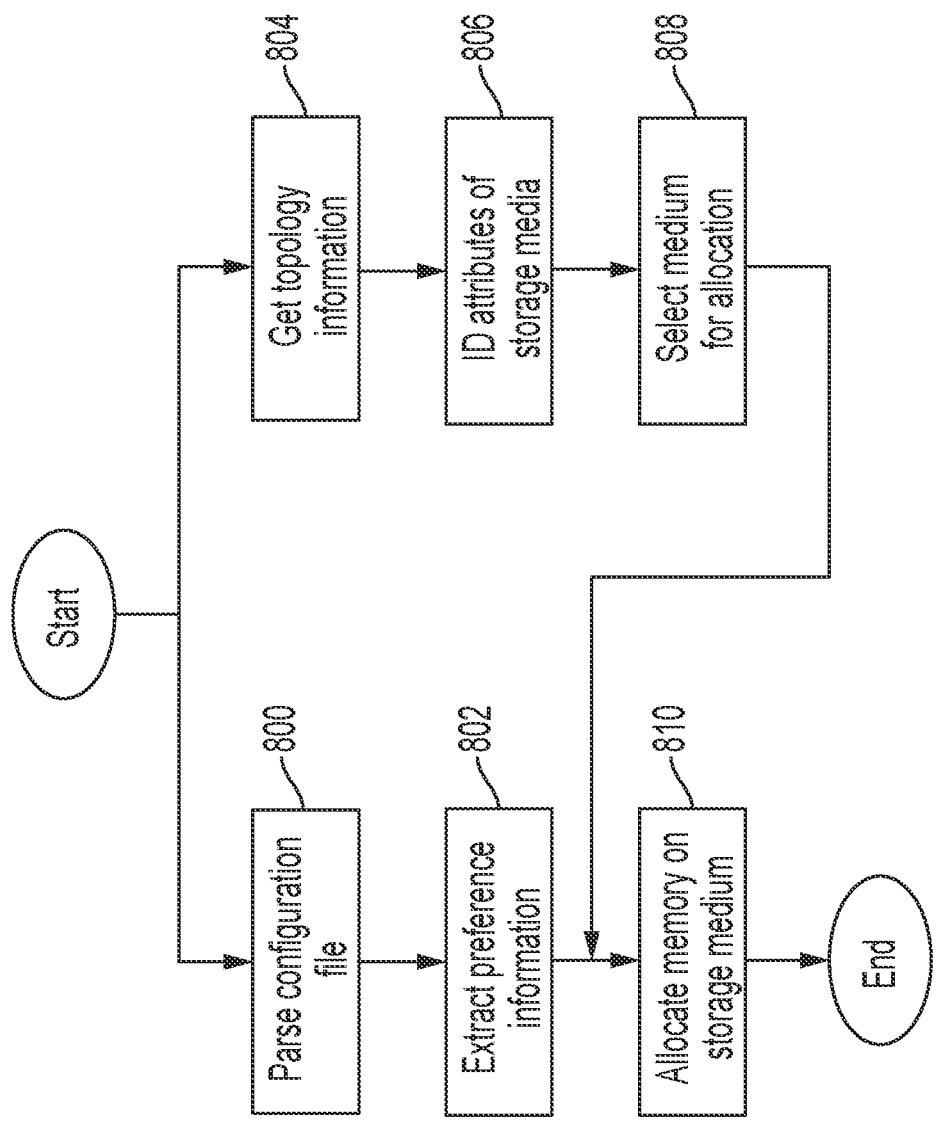
FIG. 8 depicts a flow diagram of a process for identifying a storage medium for allocating memory for an application according to one or more embodiments.

FIG. 8 depicts a flow diagram of a process for identifying a storage medium for allocating memory for an application according to one or more embodiments. The process starts, and in act 800, the storage manager 124 (e.g., via the storage identifier module 200) detects and parses a configuration file associated with the application. In act 802, the storage manager 124 extracts preference information set for the application. The preference information may identify which of one or more storage parameters are preferred for the application. The storage parameters may include, without limitation, bandwidth, latency, capacity, capacity threshold, and/or the like. In one example, bandwidth may be selected as the preferred storage parameter for the application.

In some embodiments, the storage manager 124 further obtains the topology information for the available storage media in act 804. For example, the storage manager may identify a first storage medium (e.g., DRAM included in the main memory 104) as having a first tier level, and a second storage medium (e.g., a CXL memory included in the storage device 102) as having a second tier level.

In act 806, the storage manager 124 further identifies attributes of the identified storage media. For example, the storage manager 124 may identify the bandwidth, latency, and/or capacity for the identified storage media.

In act 808, the storage manager 124 compares the identified preference for the application against the attributes of the identified storage media, and selects at least one storage medium that satisfies the identified preference. For example, if the preference is for bandwidth, the storage manager 124 selects the storage medium that provides the highest bandwidth.

In act 810, the storage manager 124 (e.g., via the kernel) allocates memory of a requested size on the selected storage medium.

In some embodiments, an application may not have a preference information set. In this case, the application may be assigned a default storage medium. The default storage medium may be one that has the closest distance to the application.

Figure 9:
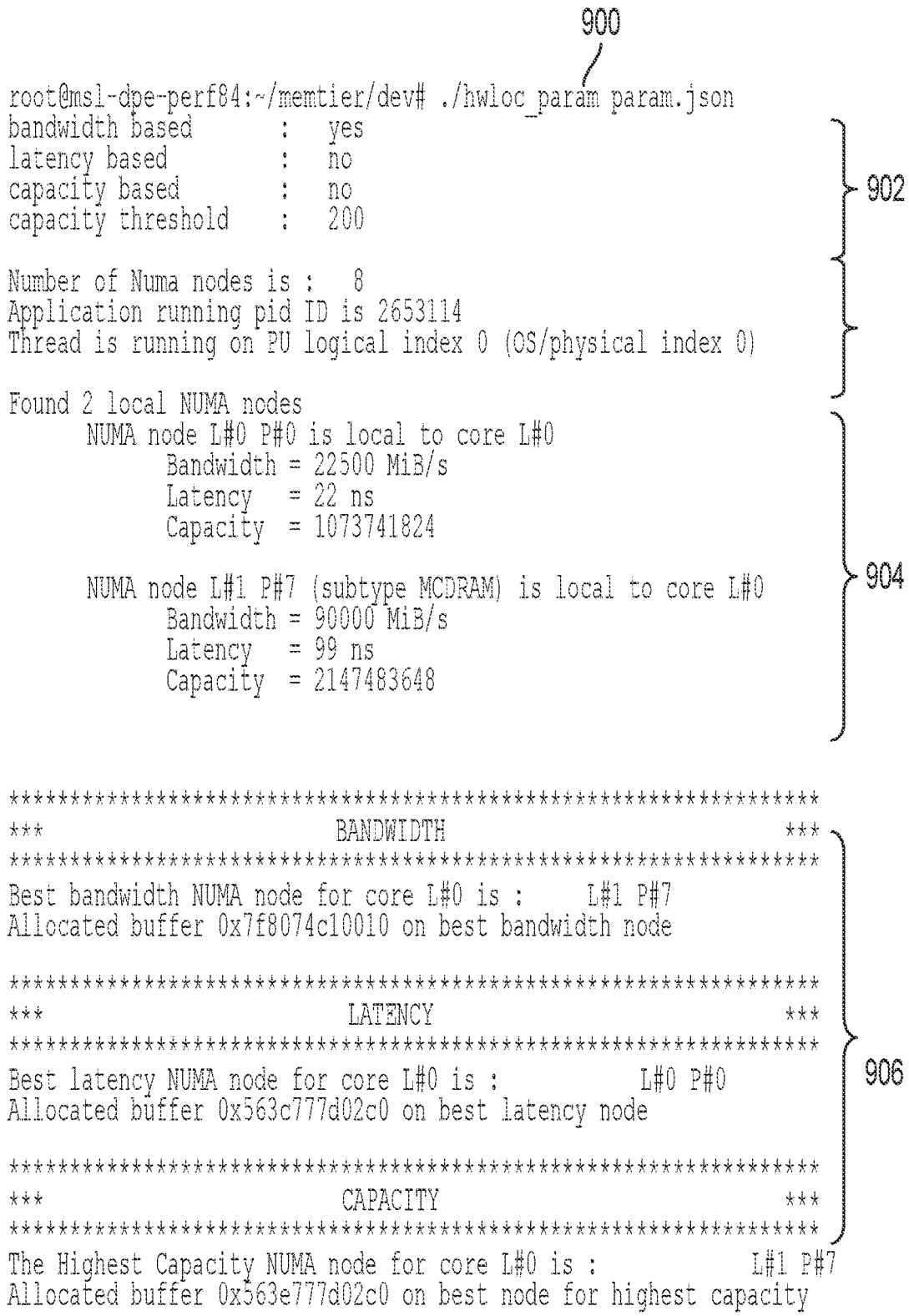
FIG. 9 depicts a screen displaying preference information for selecting a storage medium according to one or more embodiments.

FIG. 9 depicts a screen displaying preference information for selecting a storage medium according to one or more embodiments. The preference information may be associated with an application, and stored in a file 900 such as, for example, a JSON file. The storage identifier module 200 may parse the file 900 and retrieve the preference information 902 for the application. The preference information 902 may include, for example, preference for bandwidth, latency, or capacity. In the example of FIG. 9, the file 900 indicates a preference for bandwidth.

The storage identifier module 200 may further retrieve and display storage media information 904 for the local storage media. The local storage medium may be a non-uniform memory access (NUMA) node. The storage media information may include, for example, the bandwidth, latency, and capacity of the identified storage media. The storage identifier module 200 may be able to identify the appropriate storage medium for the memory allocation based on the storage media information and the preference information for the application. In the example of FIG. 9, the screen identifies information 906 of a storage medium that best caters to a particular preference attribute (e.g., bandwidth, latency, or capacity).

Figure 10:
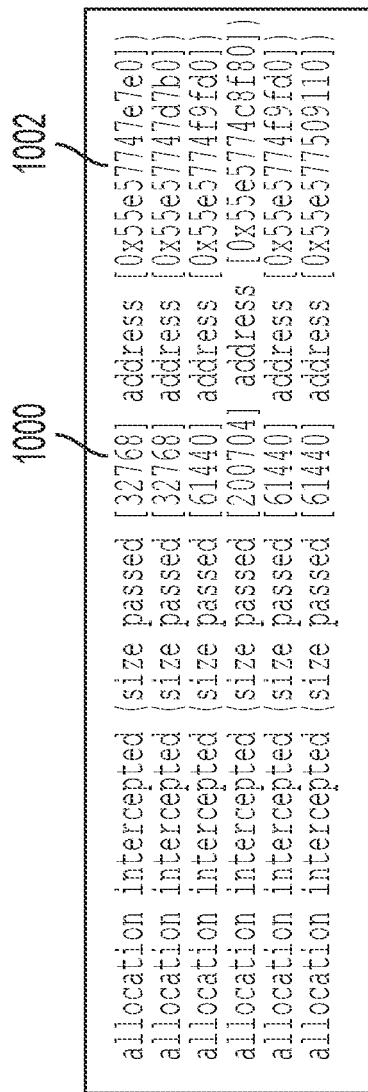
FIG. 10 depicts a screen displaying exemplary memory allocation requests that are intercepted by a memory allocation and list builder module according to one or more embodiments.

FIG. 10 depicts a screen displaying exemplary memory allocation requests that are intercepted by the memory allocation and list builder module 202 according to one or more embodiments. The intercepted memory requests may include a size 1000 of the memory allocation and an address 1002 of the first allocated page in the storage medium.

Figure 11:
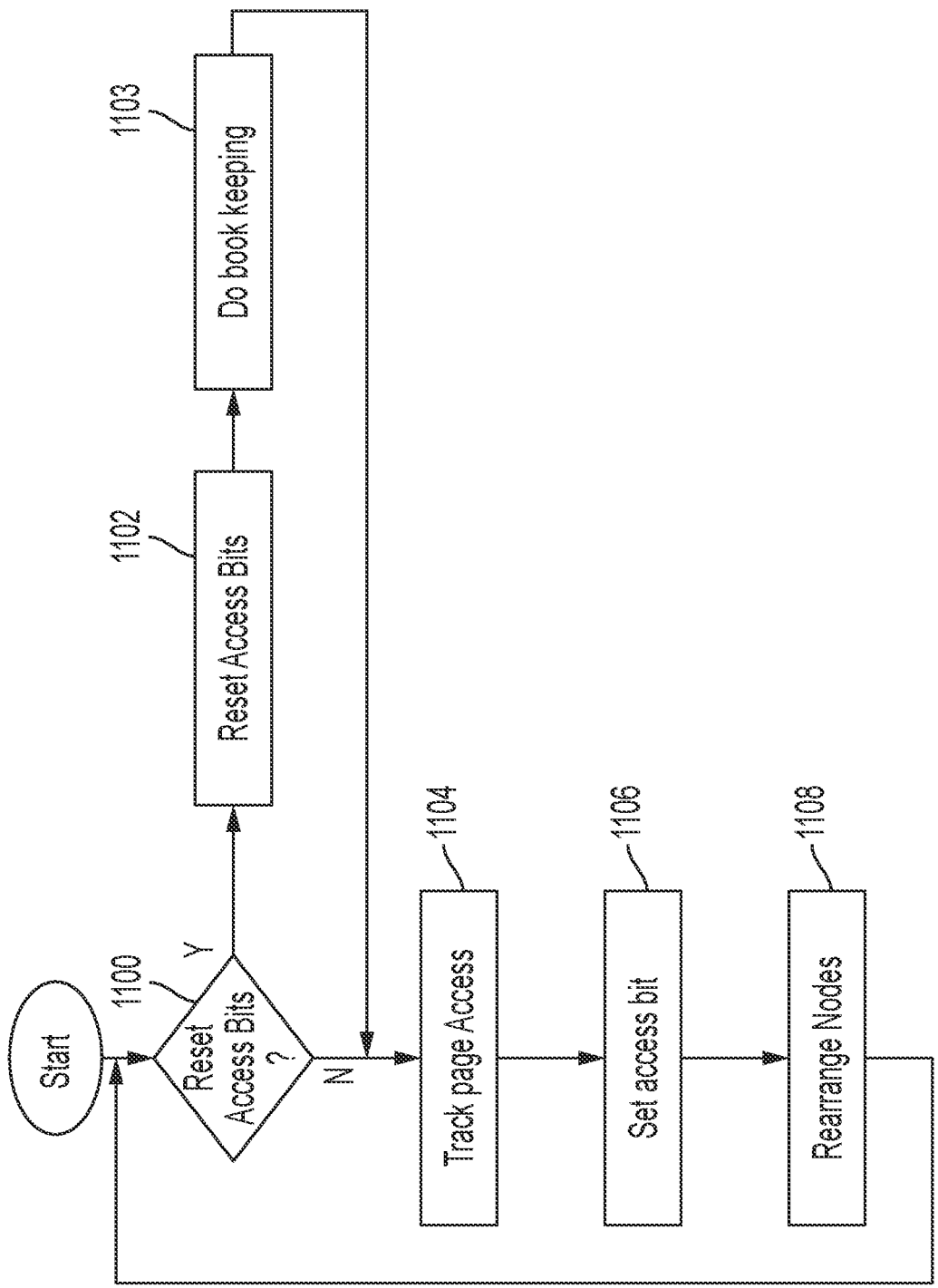
FIG. 11 depicts a flow diagram of a process for page activeness tracking and data structure reordering according to one or more embodiments.

FIG. 11 depicts a flow diagram of a process for page activeness tracking and data structure reordering according to one or more embodiments. The process starts, and the storage manager 124 (e.g., via the page tracking and list manager module 202) determines, in act 1100, whether a trigger has been detected for resetting the access bits associated with the pages. The trigger may be, for example, passage of a certain amount of time.

If the answer is YES, the access bits (e.g., the access bits 604 of FIG. 6) for the memory pages are reset (e.g., set to value "0") in act 1102. The access bits may be stored, for example, in the translation table 110 in the MMU 108.

In act 1103, the storage manager 124 may perform bookkeeping actions such as, counting the number of pages mapped to the top tier data structure 300 and the number of pages mapped to the low tier data structure 302, for determining whether page migration decisions are to be made.

In act 1104, the storage manager 124 tracks access to one or more memory pages. In this regard, the storage manager 124 receives a request to access a memory address, and determines whether the access bit for the memory address is set (e.g., set to value "1"). If the answer is NO, a page fault is triggered, and the processor 105 (e.g., the kernel) sets the access bit for the memory address in act 1106. In some embodiments, the accessed page is further included in an active list maintained by the storage manager 124.

In act 1108, the storage manager 124 determines, on a period basis, activeness of the pages represented by the nodes 310 of the data structure 300, 302. The nodes may be rearranged based on the activeness information. For example, the nodes representing pages with set access bits may be moved towards a head of the data structure, and nodes representing pages with reset access bits may be moved towards a tail of the data structure.

FIG. 12 depicts a screen displaying a list 1200a-1200d of page numbers that have been accessed (e.g., touched), and for which access bits have been set according to one or more embodiments.

Figure 13:
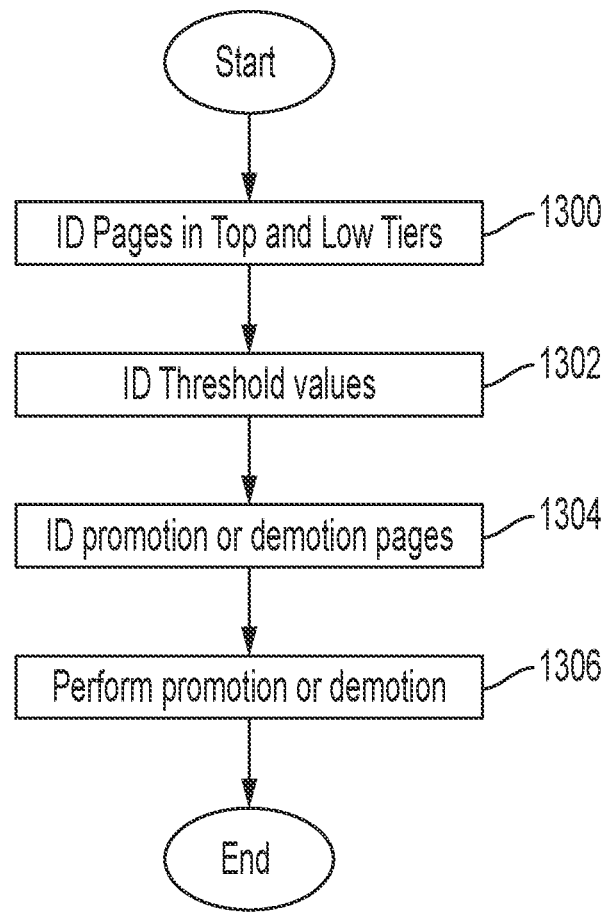
FIG. 13 depicts a flow diagram of a process for making page migration decisions according to one or more embodiments.

FIG. 13 depicts a flow diagram of a process for making page migration decisions according to one or more embodiments. The process starts, and in act 1300, the storage manager 124 (e.g., via the page migration module 206) identifies a number of pages represented via nodes in the top tier data structure 300, and a number of pages represented via nodes in the low tier data structure 302.

In act 1302, the storage manager 124 identifies one or more threshold values. The threshold values may include, for example, a maximum threshold number indicative of a maximum number of pages to be mapped for the corresponding data structure 300, 302. The threshold values may also include, for example, a minimum threshold number indicative of a minimum number of pages to be mapped for the corresponding data structure 300, 302.

In act 1304, one or more pages to be promoted or demoted are selected based on the current number of pages represented in the one or more tiers, and the one or more threshold values. In some embodiments, the storage manager 124 identifies a number of pages mapped to the tier that exceed the maximum threshold number, and selects the pages to migrate from the tier based on the identified number. For example, if the number of pages mapped to the top tier data structure 300 exceed the maximum threshold by 5 pages, the storage manager 124 selects 5 pages mapped to the tail of the data structure 300 to migrate (e.g., demote) to the low tier data structure 302.

In some embodiments, the storage manager 124 determines that the number of pages represented in the top tier data structure 300 are below the minimum threshold number. In this case, the storage manager 124 identifies pages from the low tier data structure 302 to migrate (e.g., promote) to the top tier data structure 300.

In act 1306 the storage manager 124 promotes or demotes the selected pages between the top and low tier data structures 300, 302. In some embodiments, the promotion or demotion includes removing and reconnecting pointers or links from/to neighboring nodes between the top and low tier data structures 300, 302. In some embodiments the physical pages that correspond to the promotion or demotion decisions are also moved from one storage medium to another.

FIG. 14 depicts a screen displaying information about pages to be promoted from the low tier data structure 302 to the top tier data structure 300 according to one or more embodiments. In the example of FIG. 14, a count 1400 for the top tier data structure 300 indicates that 132 pages have been mapped to the top tier, and a count 1402 for the low tier data structure 302 indicates that 21 pages have been mapped to the low tier. In the example of FIG. 14, the maximum threshold number 1404 is 1000. Because the number of pages mapped to the top tier is below the maximum threshold number, the storage manager 124 selects a promotion count 1406 that corresponds to all 21 pages from the low tier data structure for promoting to the top tier data structure. After the promotion, a count 1408 for the top tier is updated to 153 pages.

Figure 15:
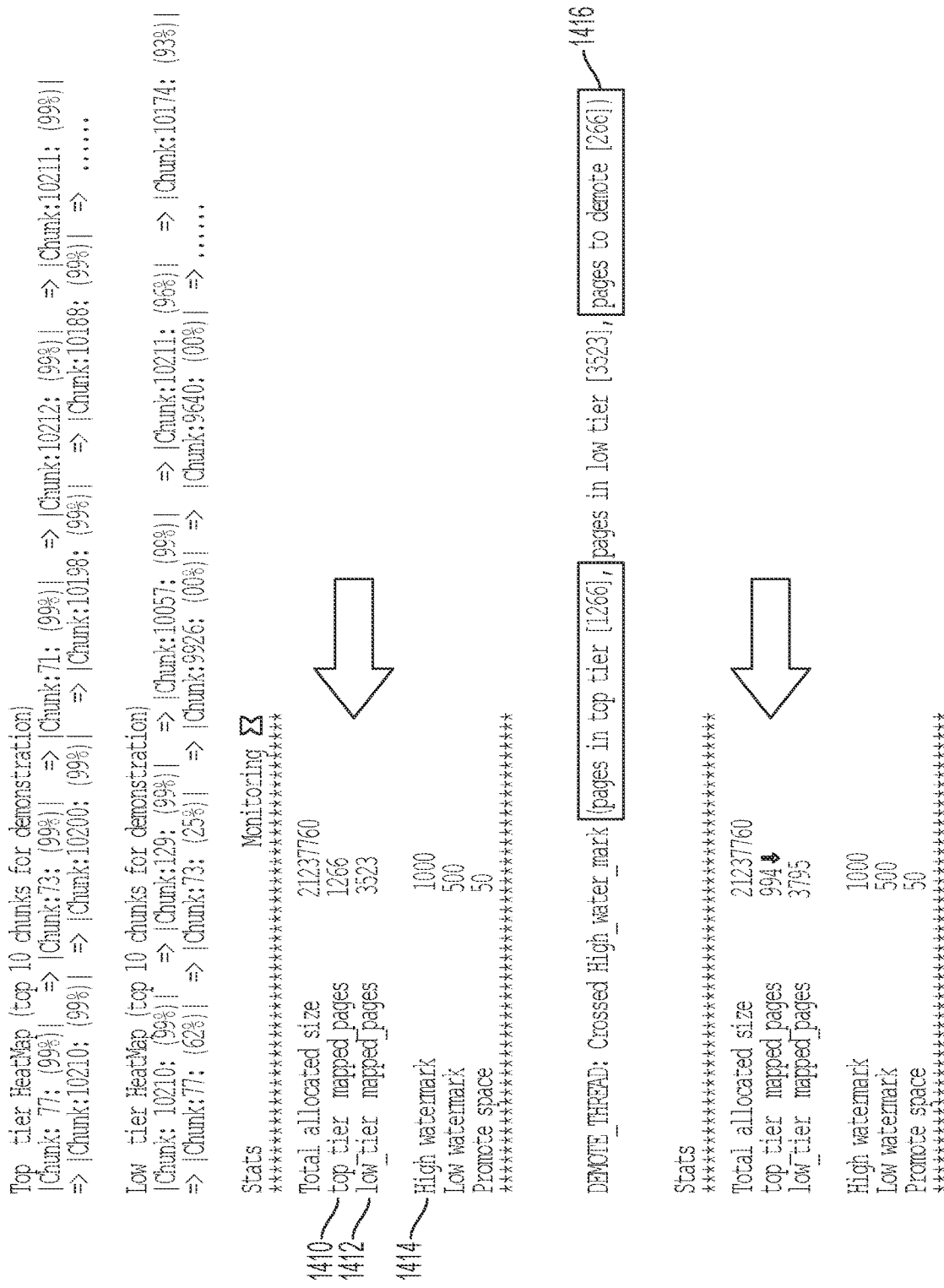
FIG. 15 depicts a screen displaying information about pages to be demoted from a top tier data structure to a low tier data structure according to one or more embodiments.

FIG. 15 depicts a screen displaying information about pages to be demoted from the top tier data structure 300 to the low tier data structure 302 according to one or more embodiments. In the example of FIG. 15, a count 1410 for the top tier data structure 300 indicates that 1266 pages have been mapped to the top tier, and a count 1412 for the low tier data structure 302 indicates that 3523 pages have been mapped to the low tier. In the example of FIG. 15, the maximum threshold number 1414 is 1000. Because the pages mapped to the top tier exceed the maximum threshold number, the storage manager 124 selects 266 pages to be demoted to the low tier as indicated via a demotion number 1416.

In some embodiments, the storage manager 124 provides a page locking feature for one or more applications. An application subscribed to the page locking option may indicate (e.g., in the configuration file), an amount of memory (or pages) that are to remain in the top tier data structure 300. For example, the configuration file may specify that 500 pages (or 2 MB of memory assuming each page is 4 KB) are to stay in the top tier. In this case, the storage manager 124 identifies the hottest 500 pages towards the head of the top tier data structure, and identifies the pages as "locked." In some embodiments, "locked" pages are prevented from being demoted to the low tier data structure 302, even in the presence of memory pressure. In some embodiments, the remaining pages mapped to the top tier data structure 300 are identified as "unlocked," and may be eligible for being demoted to the low tier data structure 302.

In some embodiments, the configuration file may specify a percentage of the pages that are to stay locked. For example, if the percentage is 50%, the storage manager 124 locks 50% of pages in the top tier (e.g., the hottest 50% of pages). The remaining 50% of the page are unlocked and eligible for demotion.

Figure 16:
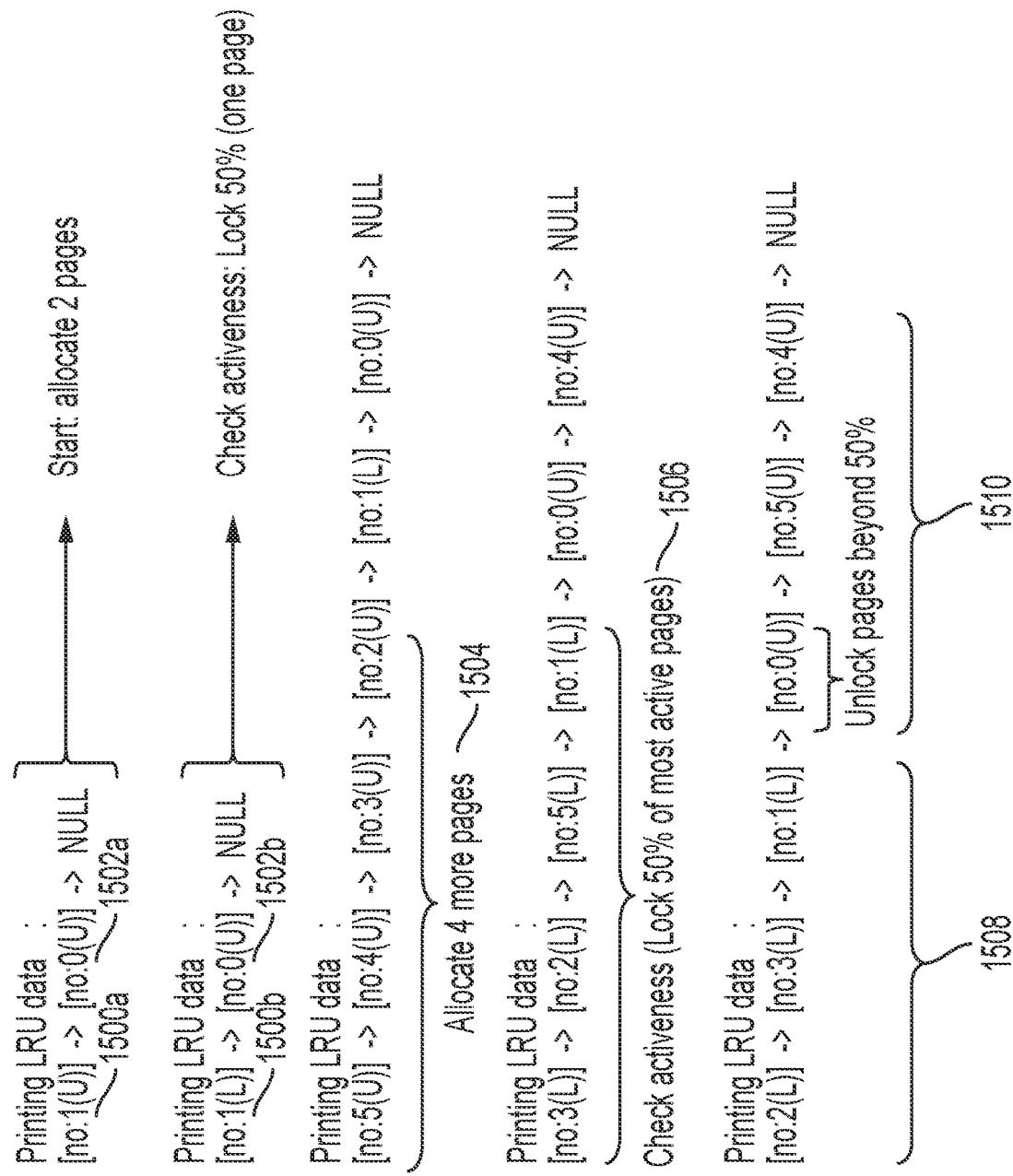
FIG. 16 depicts a screen displaying information on pages that are locked and unlocked for demotion according to one or more embodiments.

FIG. 16 depicts a screen displaying information on pages that are locked and unlocked for demotion according to one or more embodiments. In the example of FIG. 16, two pages (represented via corresponding nodes) are in an unlocked (U) state 1500*a*, 1502*a*. Assuming that 50% of allocated pages are to be locked, the storage manager 124 places node 1 that has an access bit set, in a locked (L) state 1500*b*, and node 0 that has an unset access bit, remains in unlocked state 1502*b*.

In the example of FIG. 16, four more pages (nodes 5, 4, 3, and 2) 1504 are mapped to the top tier data structure 300. The storage manager 124 checks the activeness of the mapped pages 1506, and identifies that nodes that are active (hot) (nodes 3, 2, 5, and 1). Given that only 50% of page are to be locked, the storage manager 124 identifies three of the active pages (represented via nodes 2, 3, and 1) 1508 towards the head of the data structure as locked, and the remaining pages (represented via nodes 0, 5, and 4) 1510 are marked as unlocked.

Memory Access Tracking

In some embodiments, one node 310 of the data structure (e.g., a linked list) 300, 302 represents a page of allocated memory, and memory access tracking granularity is at a page level. Generating and maintaining a node for a single page, however, may create high overhead. For example, processing a "free" pointer request may require knowing the size of the pages related to the allocation. A hash map may be needed to find the allocation size for the pointer. The allocation size may be divided by the page size to find the number of pages to free. The nodes of the linked list data structure may then need to be traversed to find the nodes representing the pages to be freed, and to remove the nodes. The previous and next nodes linked to the removed node may also need to be reconnected.

Other problems in providing a memory tiering solution using nodes that represent single memory pages include: 1) moving pages between memory tiers may require removal of nodes from a linked list in one tier, and inserting of nodes in a linked list in another tier; 2) pages represented by the nodes may be identified as either hot or cold with no fine grain differentiation; 3) position of a page in the linked list may not indicate access frequency as pages are either hot or cold based on whether the corresponding access bits have been set; 4) determining hotness of a single page based on its access bit does not leverage locality where access of a page may also indicate probability of access of surrounding pages; and 5) a node is allocated for a page even if the page is not physically allocated in the storage medium, introducing high overhead and affecting the tracking of pages that have been allocated.

In some embodiments, memory tiering operations as discussed above may be efficiently handled by representing a memory allocation via one or more chunk-sized nodes (hereinafter referred to as chunks) in a top tier data structure and a low tier data structure. A chunk may represent one or more consecutive physical memory pages of a given page size. The chunk may have a starting address of the first memory page. The remaining memory pages may be accessed based on a page size or offset.

In some embodiments, representing the memory pages via chunks may minimize the space/capacity overhead needed to track pages. In this regard, page activeness may be tracked without physically allocating a node to represent a page. In some embodiments, activeness tracking is performed on a chunk-by-chunk basis that leverages locality of memory pages. Memory locality assumes that a page is accessed by a process, there is also a high likelihood that neighboring pages may also be accessed. In some embodiments, the chunks are reordered based on the activeness tracking of the chunks, allowing the reordering to occur on a group of pages instead of individual pages.

In some embodiments, migration of pages from one tier to another also occurs without physically adding or removing nodes to or from a data structure. In this regard, a first chunk generated in a first tier may be connected to a second chunk in a second tier. The second chunk in the second tier may represent the same pages represented by the first chunk. A first information (e.g., a first page mask) may be stored in the first chunk, and a second information (e.g., a second page mask) may be stored in the second chunk. The first page mask may indicate whether one or more pages represented by the first and second chunks belong in the first tier. The second page mask may indicate whether the one or more pages belong in the second tier.

In some embodiments, a page is migrated from one tier to another by modifying the value in the first and second page masks. For example, a page may be demoted from the first tier to the second by setting a bit corresponding to the demoted page in the first page mask to "0," and setting a bit corresponding to the demoted page in the second page mask to be "1." A page may similarly be promoted from the second tier to the first tier by setting a bit corresponding to the promoted page in the first page mask to be "1," and setting a bit corresponding to the promoted page in the second page mask to be "0."

Figure 17:
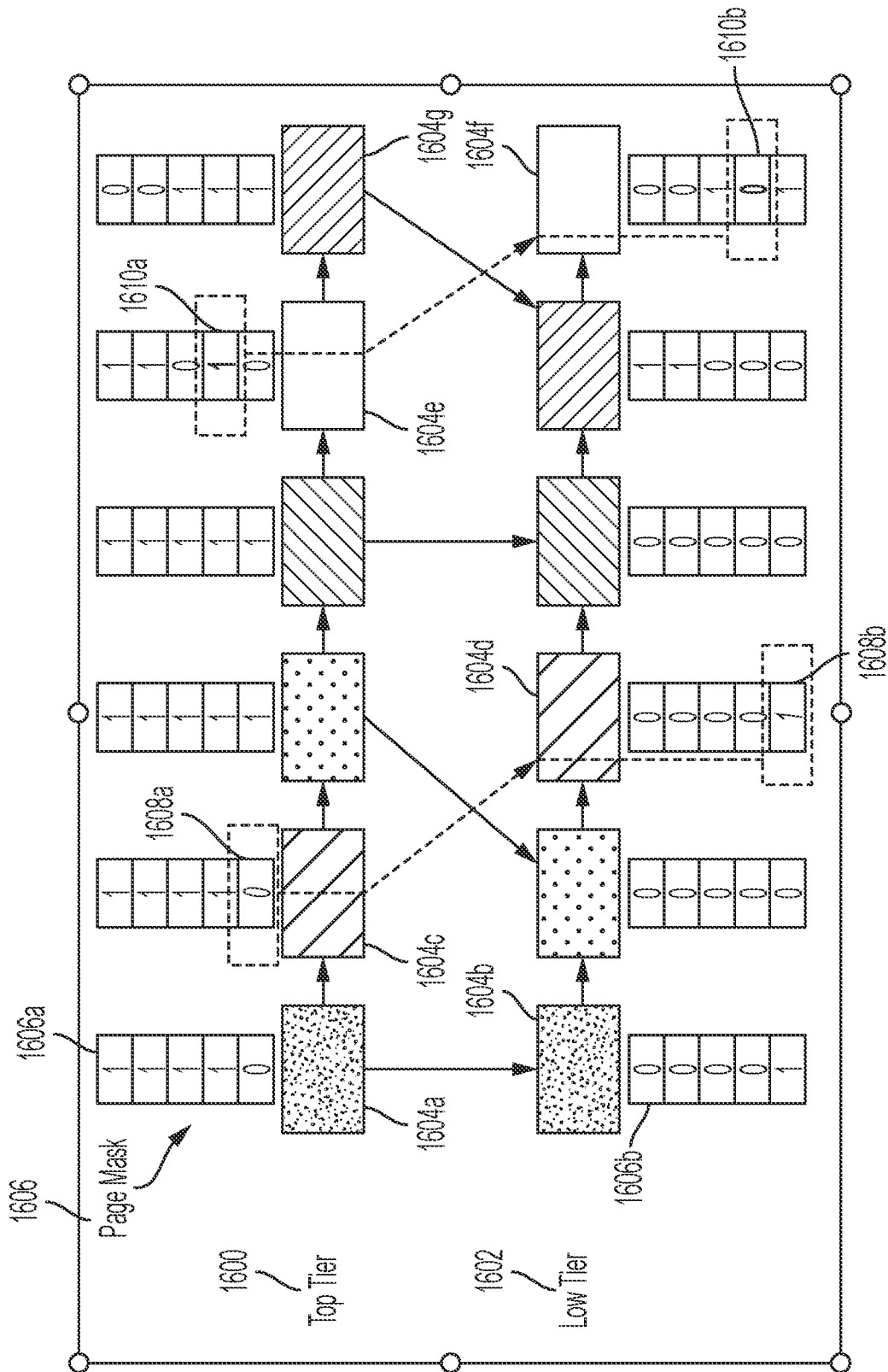
FIG. 17 depicts a conceptual layout diagram of a first data structure (referred to as a "top tier"), and a second data structure (referred to as a "low tier") according to one or more embodiments.

FIG. 17 depicts a conceptual layout diagram of a first data structure (referred to as a "top tier") 1600, and a second data structure (referred to as a "low tier") 1602 according to one or more embodiments. The top tier 1600 may be similar to the top tier data structure 300 of FIG. 3, and the low tier 1602 may be similar to the low tier data structure 302 of FIG. 3, except as described herein.

In some embodiments, one or more chunks 1604a-1604d (collectively referenced as 1604) are generated in the top tier 1600 and in the low tier 1602 in response to a memory allocation request from an application. A chunk 1604 may represent a group of memory pages, where a memory page has a set page size. In some embodiments, a chunk size is a multiple of the page size (e.g., 64 KB, 128 KB, and the like).

In some embodiments, a chunk in the top tier 1600 is linked to a chunk in the lower tier 1602. For example, chunk 1604a may the linked to chunk 1604b, and chunk 1604c may be linked to chunk 1604d. In some embodiments, the same group of memory pages represented by a chunk in the top tier (e.g., chunk 1604a) is also represented by a corresponding chunk in the low tier (e.g., chunk 1604b). In some embodiments, a chunk (e.g., chunk 1604a) is further linked to a next chunk (e.g., chunk 1604c) in the tier.

In some embodiments, a chunk 1604 includes a page mask 1606. The size of the page mask corresponds to the number of pages represented by the chunk. For example, the size of the page mask for a chunk representing 5 pages is 5 bits in length. In some embodiments, a bit of the page mask is set to "1" or "0" depending on whether the associated page is stored in the top tier 1600 or the low tier 1602. For example, chunk 1604a sets the bits of the page mask 1606a to "1" for pages that are stored in the top tier 1600, and to "0" for the pages that are stored in the low tier 1602. The corresponding chunk 1604b sets the bits of the page mask 1606b to "0" for pages that are stored in the top tier 1600, and to "1" for the pages that are stored in the low tier 1606.

A page may be promoted or demoted from one tier to another tier by modifying the corresponding bit in the page mask in the two tiers. For example, a page represented by mask bit 1608a in chunk 1604c in the top tier 1600 may be "moved" (e.g., demoted) to the low tier by changing the value of the mask bit 1608a to "0", and changing the value of the mask bit 1608b in the corresponding chunk 1604d in the low tier 1602 to "1." In another example, a page represented by mask bit 1610b in chunk 1604f in the low tier 1602 may be "moved" (e.g., promoted) to the top tier by changing the value of the mask bit 1610b to "0," and changing the value of the mask bit 1610a in the corresponding chunk 1604e in the top tier 1600 to "1."

In some embodiments, the storage manager 124 determines the number of chunks needed for an allocation based on the size of the allocation and the size of the chunks. For example, if a chunk size is 64K, and the allocation size is 128K, the allocation is divided into two 64K chunks in each tier 1600, 1602. In this regard, the storage manager 124 generates two chunks in the top tier 1600, and two chunks in the low tier 1602. In addition, assuming that the page size is 4K, each chunk includes 16 pages that are represented by 16 bits of a page mask. The pages in the chunk may be accessed using the virtual address of the first memory page (chunk_ptr), and the page size or offset as follows:

$$\text{Page } 0 = \text{chunk\_ptr}$$
$$\text{Page } 1 = \text{chunk\_ptr} + (\text{PAGE\_SIZE} * 1)$$
$$\text{Page } 2 = \text{chunk\_ptr} + (\text{PAGE\_SIZE} * 2)$$
$$\vdots$$

Assuming that for the initial allocation the memory is allocated in a storage medium associated with the top tier, the page masks stored in the two top tier chunks are set to "1," and the page masks stored in the two bottom tier chunks are set to "0."

Figure 18:
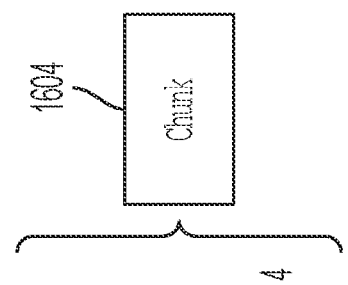
FIG. 18 depicts metadata stored in a chunk according to one or more embodiments.

FIG. 18 depicts metadata 1700 stored in a chunk 1604 according to one or more embodiments. In some embodiments, the metadata 11700 includes an address (e.g., a virtual address) 1702 of a first page of the allocated memory (also referred to as chunk_ptr), and a size 1704 of the allocation. In some embodiments, activeness of the chunk is stored as activeness percentage metadata 1706. The metadata 1700 may further store a page mask 1708 for indicating the location (e.g., top tier 1600 or low tier 1602) of a page represented by the chunk 1604. In some embodiments, a page count 1710 provides a count of a number of valid pages that have been touched or accessed. In some embodiments, the metadata 1700 further includes a pointer 1712 to a next chunk in the same tier, and a pointer 1714 to a corresponding chunk in a different tier.

In some embodiments, the storage manager 124 is configured to track activeness of a chunk 1604 for determining whether a position of the chunk in the tier should be modified. In this regard, the storage manager (e.g., via the page tracking the list manager module 202) determines activeness of the individual pages mapped to the chunk, and computes the chunk activeness value based on activeness of the individual pages. For example, if 4 out of 5 pages of a chunk are detected as hot, the activeness of the chunk is calculated to be 80%. The activeness percentage may be saved in the chunk as percentage metadata 1706.

Figure 19:
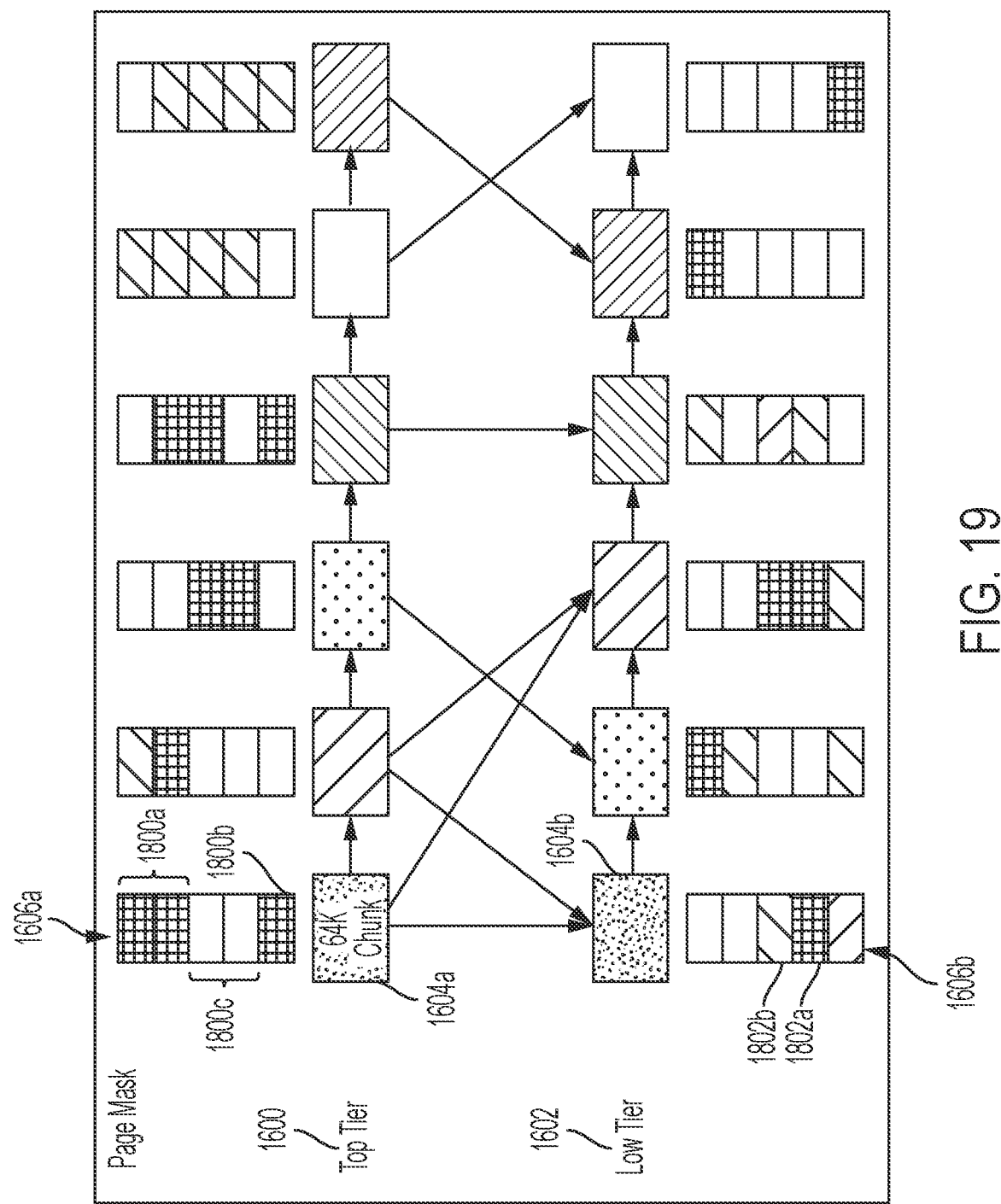
FIG. 19 depicts a conceptual layout diagram of activeness data detected for individual pages represented by a chunk according to one or more embodiments.

FIG. 19 depicts a conceptual layout diagram of activeness data detected for individual pages represented by a chunk according to one or more embodiments. Because the same pages are represented via corresponding chunks (e.g., chunk 1604a and chunk 1604b) in the top and low tiers 1600, 1602, the storage manager 124 traverses the chunks in either tier once, to retrieve activeness information for individual pages. The address of the individual pages may be identified based on the address 1700 of the first page of the memory as stored as the chunk metadata 1700, and the page size 1704. For example, if a chunk 1604 has 5 pages, the addresses of the pages to be checked for activeness may be computed as follows:

$$\text{Page } 4 = (\text{chunk\_ptr} + (\text{PAGE\_SIZE}) * 4)$$
$$\text{Page } 3 = (\text{chunk\_ptr} + (\text{PAGE\_SIZE}) * 3)$$
$$\text{Page } 2 = (\text{chunk\_ptr} + (\text{PAGE\_SIZE}) * 2)$$
$$\text{Page } 1 = (\text{chunk\_ptr} + (\text{PAGE\_SIZE}) * 1)$$
$$\text{Page } 0 = (\text{chunk\_ptr} + (\text{PAGE\_SIZE}) * 0)$$

In checking activeness of a page, the storage manager 124 may lookup a computed page address in the translation table 110 (FIG. 6) and determine whether the access bit 604 for the page address has been marked as accessed (hot) or not (cold). The page mask 1606 may be used to determine whether the page is in the top tier 1600 or the low tier 1602. A count variable for the appropriate chunk 1604 in either the top tier 1600 or the low tier 1602 may be increased in response to determining that the looked-up page has a set access bit.

In the example of FIG. 19, pages represented via page mask bits 1800*a* and 1800*b* are identified by the top page mask 1606*a* for chunk 1604*a*, as being in the top tier (e.g., has the corresponding bits of the page mask set). The pages represented via the mask bits 1800*a* and 1800*b* are identified as hot pages (e.g., have the access bits set in the translation table 110), and are therefore added to the access count for chunk 1604*a*.

The pages represented by page mask bits 1800*c* are not set in the top page mask 1606*a*, indicating that the pages are in the low tier 1602. These pages are represented via page mask bits 1802*a* and 1802*b* in chunk 1604*b* in the low tier. The storage manager 124 performs a lookup of the pages represented by the page mask bits 1800*c* in the translation table 110, and determines whether the pages are hot or cold. In the example of FIG. 19, the page represented by page mask 1802*b* is hot, while the page represented by page mask 1802*b* is cold.

In some embodiments, the storage manager 124 computes an activeness percentage for the chunks 1604*a* and 1604*b* based on the corresponding access counts. For example, the activeness value for chunk 1604*a* according to the example of FIG. 19 is 100% given that all three pages represented by the chunk have been accessed. The activeness value for chunk 1604*b* is 50% given that only one of the two pages represented by the chunk have been accessed.

Figure 20:
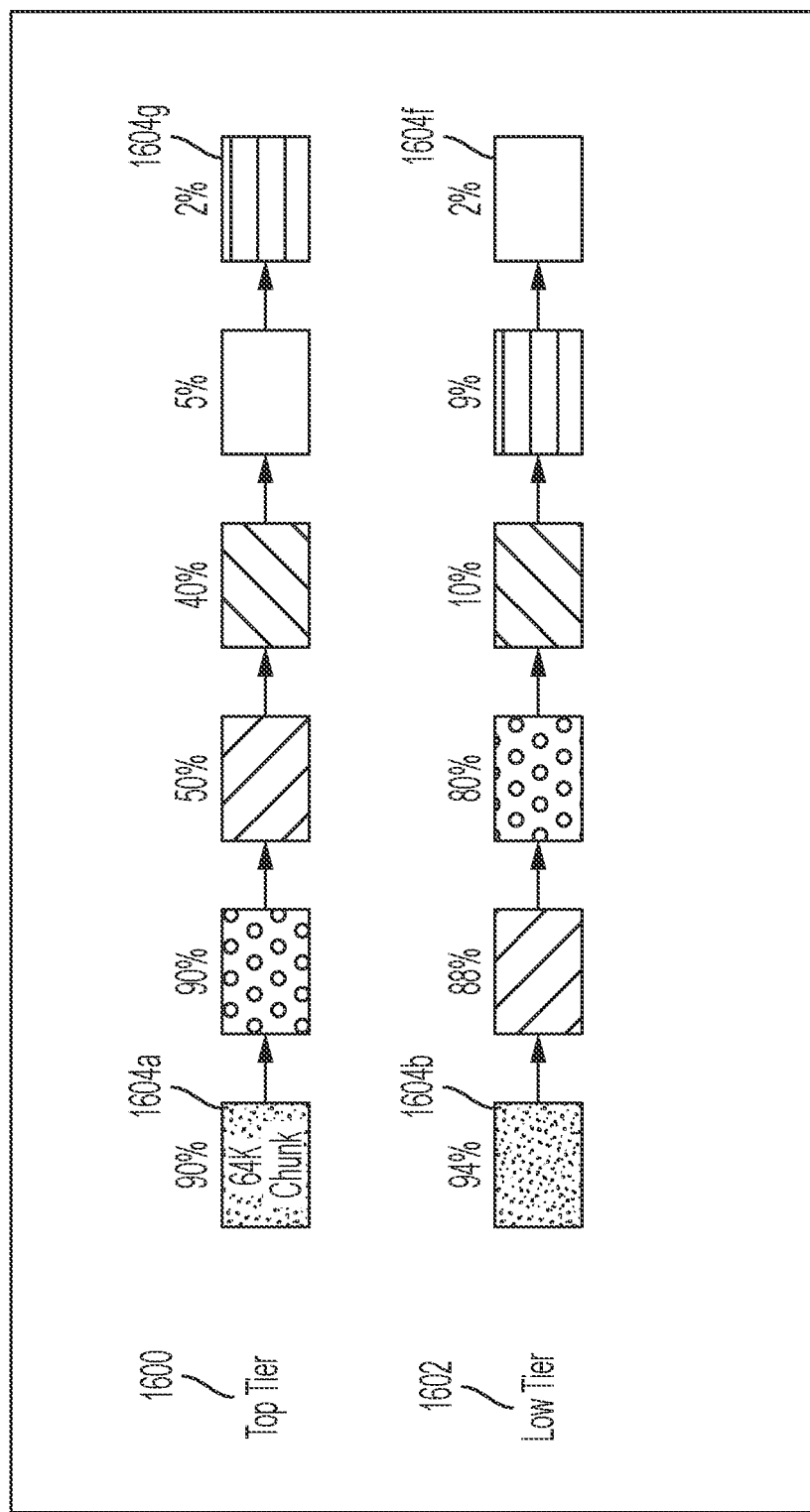
FIG. 20 depicts a conceptual layout diagram of chunk activeness values for chunks in top and low tiers according to one or more embodiments.

FIG. 20 depicts a conceptual layout diagram of chunk activeness values for chunks 1604 in the top and low tiers 1600, 1602 according to one or more embodiments. The chunk activeness values may be stored as percentage metadata 1706 in the respective chunks. The activeness values may be used for reordering the chunks in the tier. In some embodiments, an algorithm such as a merge sort algorithm is used to rearrange the chunks based on the computed activeness values.

In the example of FIG. 20, chunk 1604*a* has a 90% activeness value and is placed at a head of the top tier data structure 1600, while chunk 1604 has a 2% activeness value and is placed at a tail of the top tier data structure. Chunk 1604*b* in the low tier 1602 has a 94% tracked activeness value and is placed at a head of the low tier data structure, while chunk 1604*f* has a 2% tracked activeness value and is placed at a tail of the low tier data structure.

Figure 21:
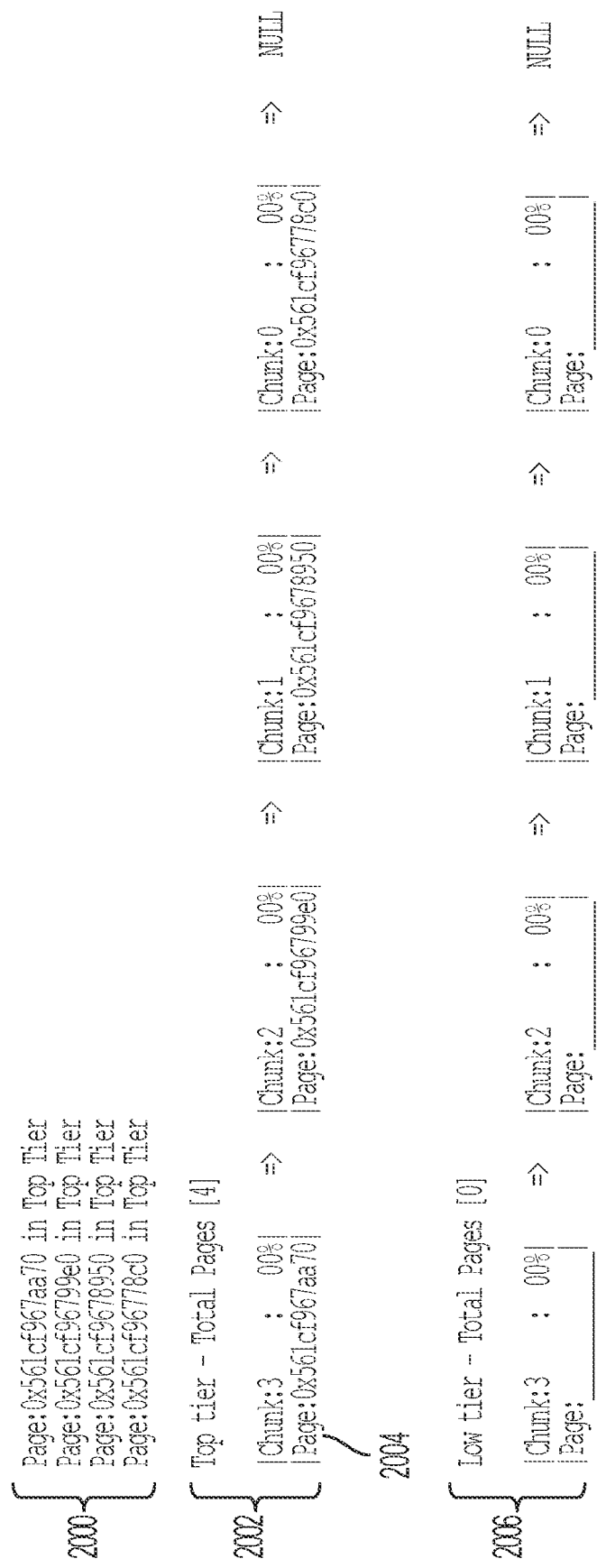
FIG. 21 depicts a screen displaying information of example chunks generated in response to a memory allocation request according to one or more embodiments.

FIG. 21 depicts a screen displaying information of example chunks generated in response to a memory allocation request according to one or more embodiments. For simplicity purposes, it is assumed for the examples of FIGS. 20-22 that each chunk contains one page (e.g., chunk size=4K, and page size=4K). Four pages 2000 are allocated in a data storage medium in the top tier in response to the memory allocation request. Four chunks 2002 are generated in the top tier to represent the allocated pages. The chunk includes an address 2004 of the page represented by the chunk. The page masks associated with the chunks 2002 may also be set in response to identifying the memory allocation in the top tier.

Chunks 2006 corresponding to the chunks 2002 in the top tier are also generated in the low tier. In the example of FIG. 21, no pages are contained in the chunks in the low tier given that the pages are allocated to the top tier.

Figure 22:
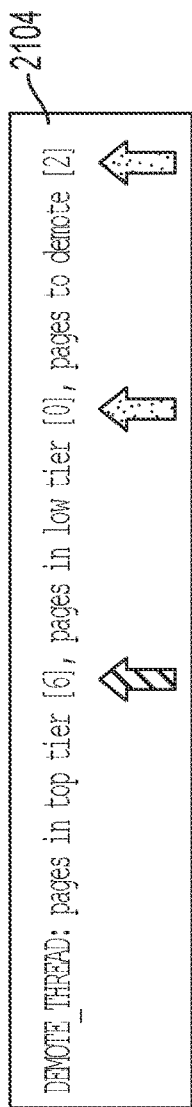
FIG. 22 depicts a screen displaying exemplary information of chunks in top and low tiers prior to a demotion decision according to one or more embodiments.

FIG. 22 depicts a screen displaying exemplary information of chunks 2102*a*, 2104*a* in the top and low tiers prior to a demotion decision according to one or more embodiments. In the examples of FIGS. 21 and 22, the maximum threshold value for storing pages in the top tier is 4. In the example of FIG. 22, the top tier contains a total of six pages 2100, exceeding the maximum threshold by two. The number of pages that are identified for demotion 2104 is therefore two.

Figure 23:
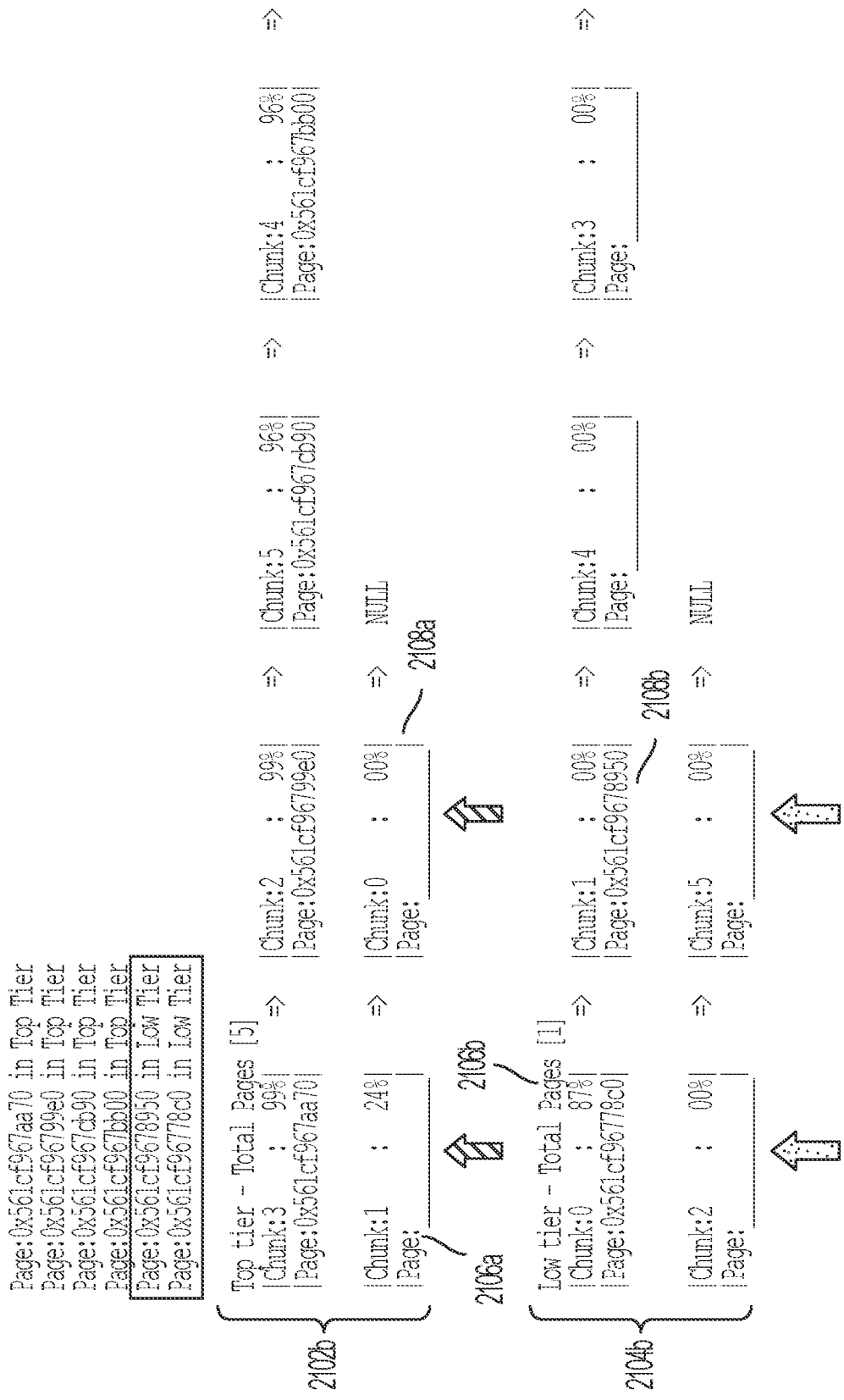
FIG. 23 depicts a screen displaying exemplary information of chunks in top and low tiers after a demotion decision based on the example of FIG. 22, according to one or more embodiments.

FIG. 23 depicts a screen displaying exemplary information of chunks 2102*b*, 2104*b* in the top and low tiers after the demotion decision based on the example of FIG. 22, according to one or more embodiments. In the example of FIG. 23, the pages represented by chunks 2106*a*, 2108*a* with the lowest activeness percentage values are selected for demotion to the low tier. The demoted pages are "moved" to the low tier, and associated with chunks 2106*b*, 2108*b*, by changing the page mask bits associated with the demoted pages to identify the low tier instead of the top tier.

Figure 24:
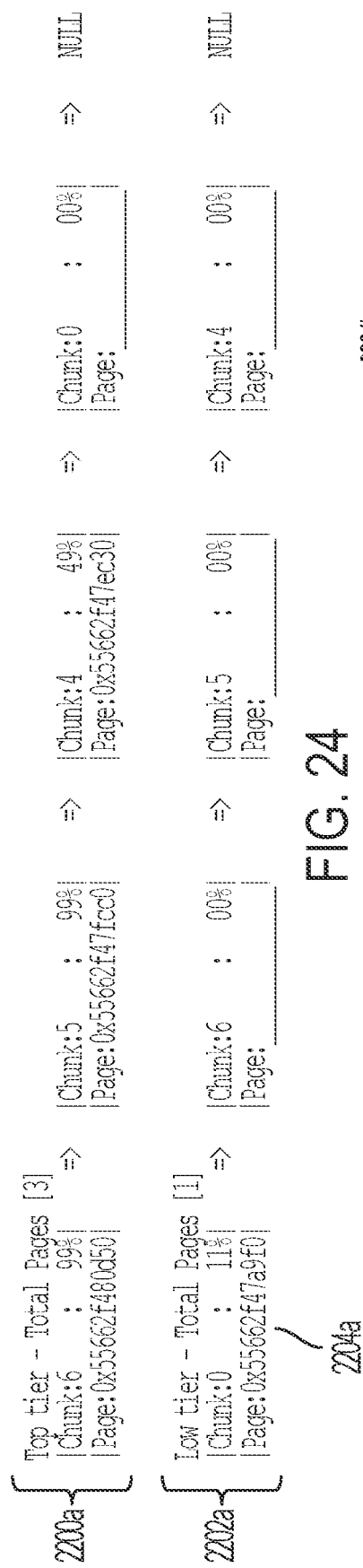
FIG. 24 depicts a screen displaying exemplary information for chunks in top and low tiers prior to a promotion decision according to one or more embodiments.

FIG. 24 depicts a screen displaying exemplary information for chunks 2200*a*, 2202*a* in the top and low tiers prior to a promotion decision according to one or more embodiments. In the example of FIG. 24, three pages are represented by the chunks 2200*a* in the top tier. The low tier contains one page represented by chunk 2204*a*. Given that there is room for one more page in the top tier, the page represented by chunk 2204*a* in the low tier is selected for promotion to the top tier.

Figure 25:
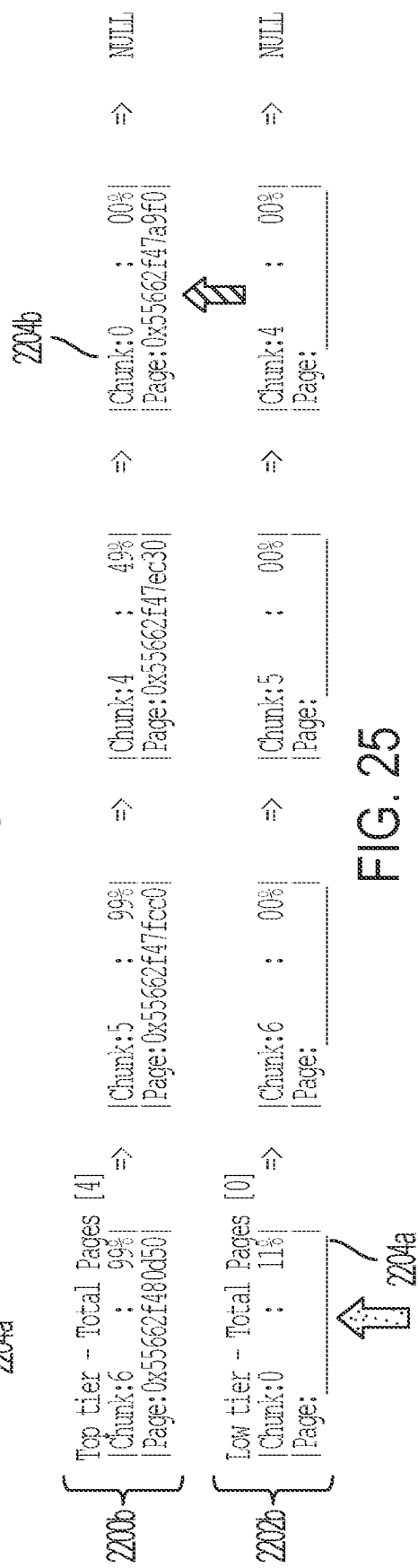
FIG. 25 depicts a screen displaying exemplary information for chunks in top and low tiers after the promotion decision based on the example of FIG. 24 according to one or more embodiments.

FIG. 25 depicts a screen displaying exemplary information for chunks 2200*b*, 2202*b* in the top and low tiers after the promotion decision based on the example of FIG. 24 according to one or more embodiments. In promoting the page represented by chunk 2204*a*, the promoted page is "moved" to the top tier, and associated with chunk 2204*b*, by changing the mask bit associated with the promoted page to identify the top tier instead of the low tier.

Figure 26:
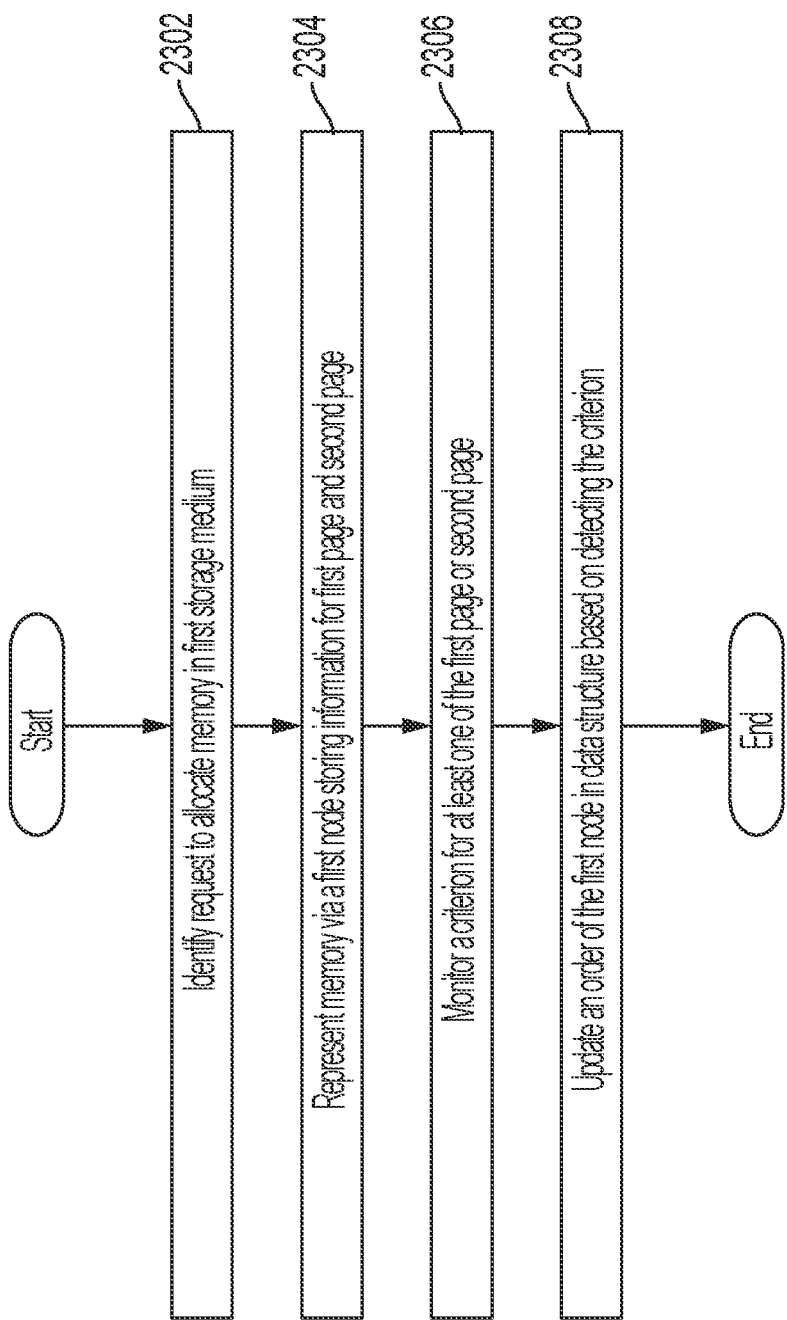
FIG. 26 is a flow diagram of a process for performing memory tiering operations according to one or more embodiments.

FIG. 26 is a flow diagram of a process for performing memory tiering operations according to one or more embodiments. In act 2302, the storage manager 124 (e.g., via the memory allocation and list builder module 202) identifies a first memory allocation.

In act 2304, the storage manager 124 represents the memory allocation via at least a first chunk-sized node (first node) of a first data structure associated with a first tier of a memory hierarchy (e.g., the top tier data structure 1600). Selection of the data structure (and the associated memory tier) may be based on preferences set for the application.

In some embodiments, the first node stores first information for a first page (first portion of the memory) and a second page (second portion of the memory). The first information may include, for example, a virtual address of the first page (e.g., address 1702), a chunk activeness percentage (e.g., activeness percentage metadata 1706), a page location mask (e.g., page mask 1708), a number of valid touched pages in the chunk (e.g., page count 1710), a pointer (e.g., pointer 1712) to a next chunk in the same tier, and a pointer (e.g., pointer 1714) to a corresponding chunk in a different tier.

In some embodiments, in addition to allocating the first node in the first data structure, a second node is also allocated in a second data structure associated with a second tier of the memory hierarchy (e.g., the low tier data structure 1602). The second node may store second information for the same first and second pages represented by the first node. The first node may be connected to the second node via pointer 1714.

In act 2306, the storage manager 124 monitors a criterion for at least the first page or the second page. The criterion may be, for example, access to the first page and/or second page by an application. In this regard, the page tracking and list manager module 204 may be invoked for determining whether the first and/or second pages have been accessed, and a chunk activeness percentage may be computed based on the determination. Although according to one or more embodiments the monitoring of the criterion is for making page migration decisions, a person of skill in the art should understand that the monitoring may be for other purposes. For example, the storage manager 124 may monitor activities to determine the pages that should be cached or prefetched for faster access, monitor the pages that should be locked to prevent them from being moved to a swap space, and/or monitor the number of times the pages in the chunks have been accessed (access frequency count), and compute a percentage value for the chunk based on the other monitored activity.

In act 2308, the storage manager updates an ordering of the first node in the first data structure based on the chunk activeness percentage. For example, the chunks may be organized in decreasing chunk activeness percentage, with the chunk with the highest activeness percentage be placed at the head of the first data structure, and the chunk with a lowest activeness percentage being placed at the tail of the first data structure. Thus, chunk activeness may be allow representing a degree or frequency of memory accesses (referred to as "warmness") instead of simply representing the activeness as hot/accessed or cold/not accessed.

Figure 27:
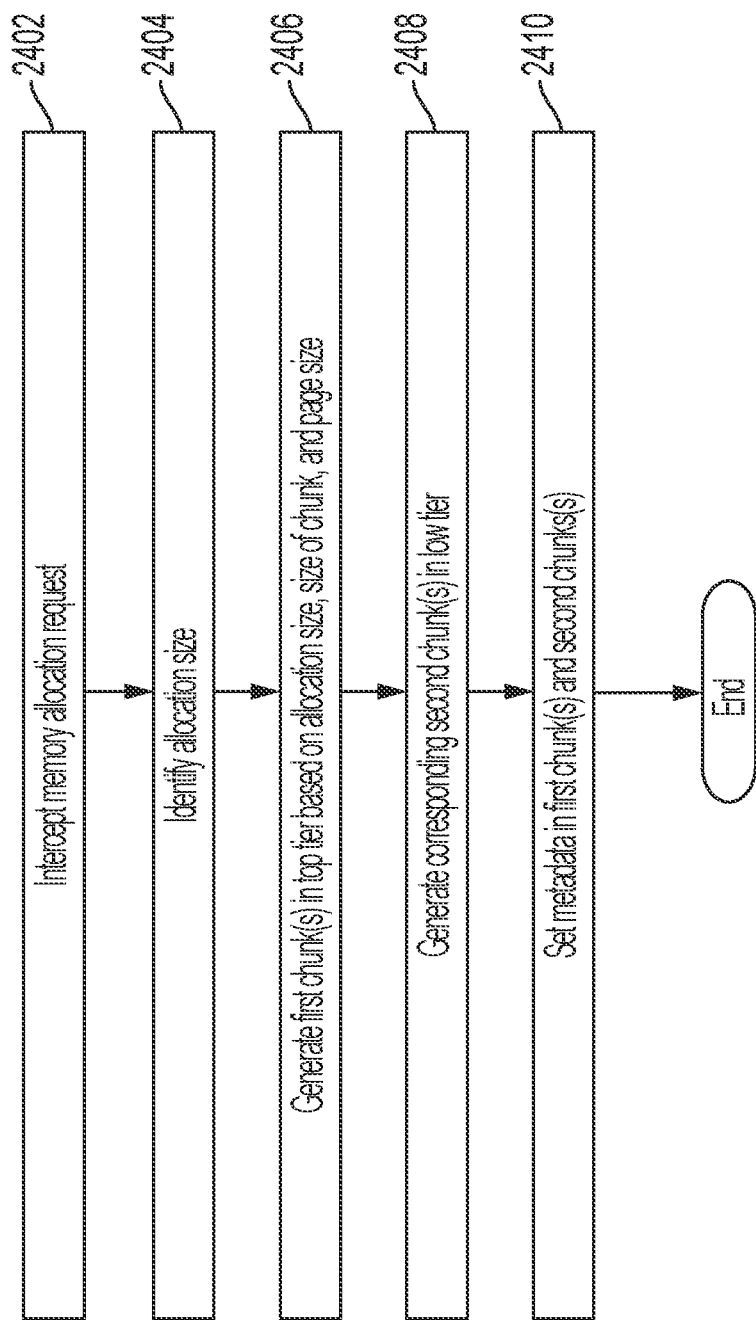
FIG. 27 is a flow diagram of a process for generating chunks in response to a memory allocation request according to one or more embodiments.

FIG. 27 is a flow diagram of a process for generating chunks in response to a memory allocation request according to one or more embodiments. The process starts, and in act 2402, the storage manager 124 (e.g., via the memory allocation and list builder module 202) intercepts a memory allocation request by an application and stores the request in a queue (e.g., queue 306 of FIG. 3).

In act 2404, the storage manager 124 identifies the allocation size.

In act 2406, the storage manager generates one or more first chunks in the top tier based on the allocation size, size of the chunks, and page size. For example, if the allocation size is 128K, the chunk size is 64K, and the page size is 4K, two chunks are generated with each chunk representing 16 memory pages.

In act 2408, one or more second chunks are generated in the low tier that correspond to the chunks generated in the top tier. For example, if two chunks are generated in the top tier, two corresponding chunks are generated in the low tier.

In act 2410, metadata for the represented pages are stored in the generated first and second chunks. For example, the metadata may identify the address of the first page represented by the chunk, and further identify whether the represented pages are in the top tier or the low tier. If the represented pages are in the top tier, the page masks in the top tier chunks are set to "1," and the page masks in the corresponding bottom tier chunks are set to "0." If the represented pages are in the bottom tier, the page masks in the bottom tier chunks are set to "1," and the page masks in the corresponding top tier chunks are set to "0."

The metadata may further include pointers to a next chunk in the same tier, and pointers to corresponding chunks in the different tier.

Figure 28:
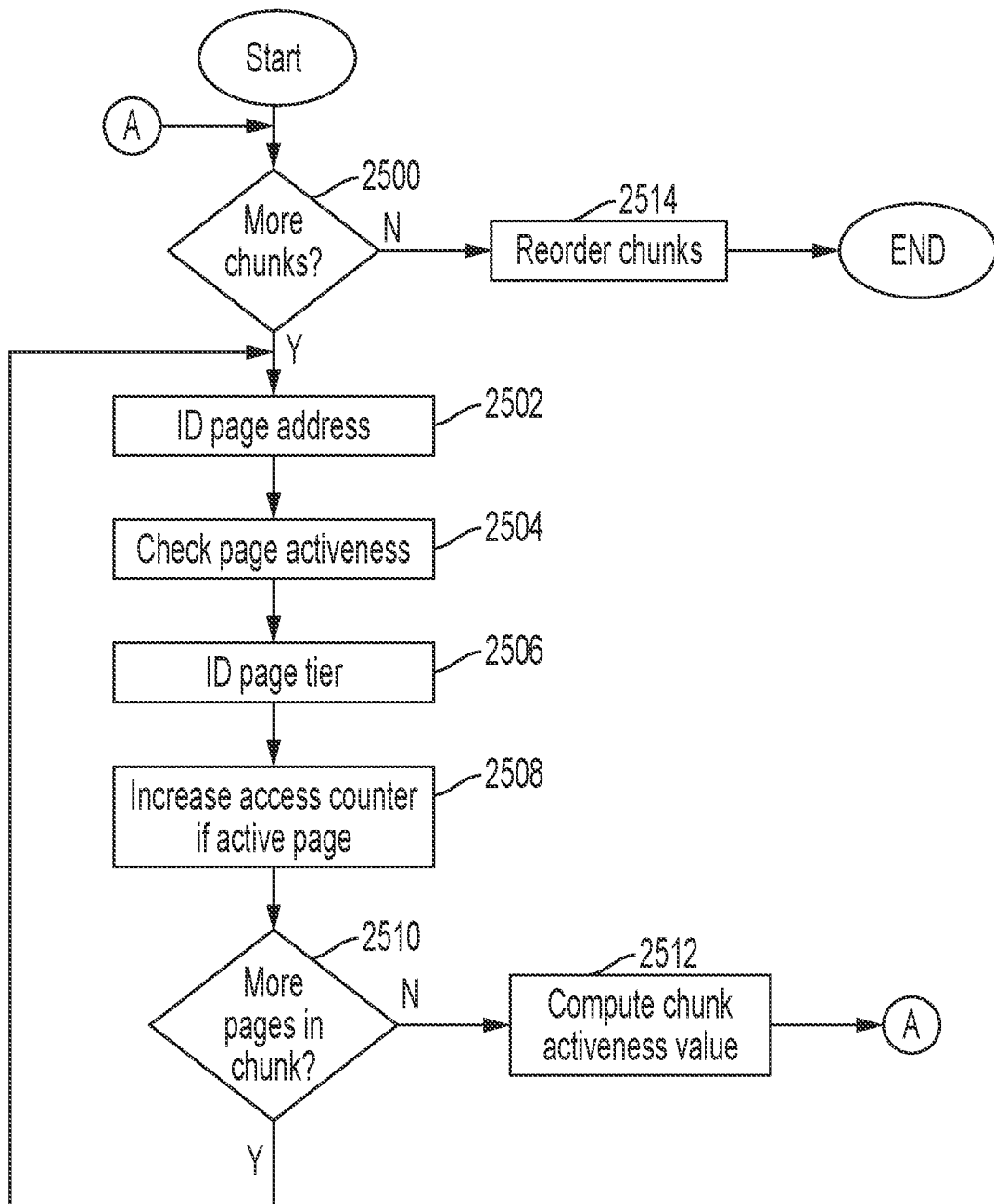
FIG. 28 depicts a flow diagram of a process for tracking activeness of chunks according to one or more embodiments.

FIG. 28 depicts a flow diagram of a process for tracking activeness of chunks 1604 according to one or more embodiments. The process starts, and in act 2500 the storage manager 124 (e.g., via the page tracking and list manager 204) determines whether there are more chunks to examine for determining activeness. In some embodiments, the process examines the chunks 1604 in one of the tiers (e.g., the top tier 1600) without the need to also examine the chunks in another tier (e.g., the low tier 1602).

If there are more chunks 1604 to examine, the storage manager 124 identifies a page address for a page associated with the chunk. The page address may be computed based on the address of a beginning page, a page offset, and a page number for which address is sought, as follows:

$$\text{Address for Page No.} = \text{chunk\_ptr} + (\text{PAGE\_SIZE} * \text{Page No.})$$

In act 2504, the storage manager 124 checks for activeness of the page using the computed address. In some embodiments, the storage manager 124 performs a lookup of the address in the translation table 110, and determines the value of the corresponding access bit 604. In some embodiments, the page is identified as a hot page in response to the access bit being set to "1," and as a "cold" page in response to the access bit being set to "0."

In act 2506, the storage manager 124 examines the page mask 1606 for identifying the tier associated with the page. For example, if the page is associated with the top tier 1600, the corresponding bit in the page mask stored in the top tier chunk has a value of "1." If the page is associated with the bottom tier 1602, the corresponding bit in the page mask has a value of "0."

In act 2508, the storage manager 124 increases a temporary activeness variable for the chunk 1604 in the top tier 1600 in response to the page being identified as a hot page in the top tier, or increases a temporary activeness variable for the corresponding chunk in the low tier 1602 in response to the page being identified as a hot page in the low tier.

In act 2510, the storage manager 124 determines whether there are additional pages in the chunk 1604. If the answer is YES, the process continues to act 2502 for determining activeness of a next page in the chunk 1604.

If the answer is NO, the storage manager 124 computes a chunk activeness value in act 2512. The chunk activeness value may be computed for the chunk 1604 in the top tier 1600 and the chunk in the low tier 1602 based on the count of the corresponding activeness variables. In some embodiments, the chunk activeness value is a percentage of hot pages in the chunk 1604. The percentage may be computed by dividing the value of the activeness counter by the total number of pages in the chunk 1604 (identified via the page mask bits 1606). The activeness value may be stored as the activeness percentage metadata 1706 for the chunk 1604.

Referring again to act 2500, if there are no more chunks 1604 in the tier to be examined, the storage manager 124 reorders the chunks, in act 2514, based on the chunk activeness values. For example, the chunks 1604 may be ordered in descending order of activeness, with the chunk with the highest activeness value being placed at the head of the data structure.

Figure 29:
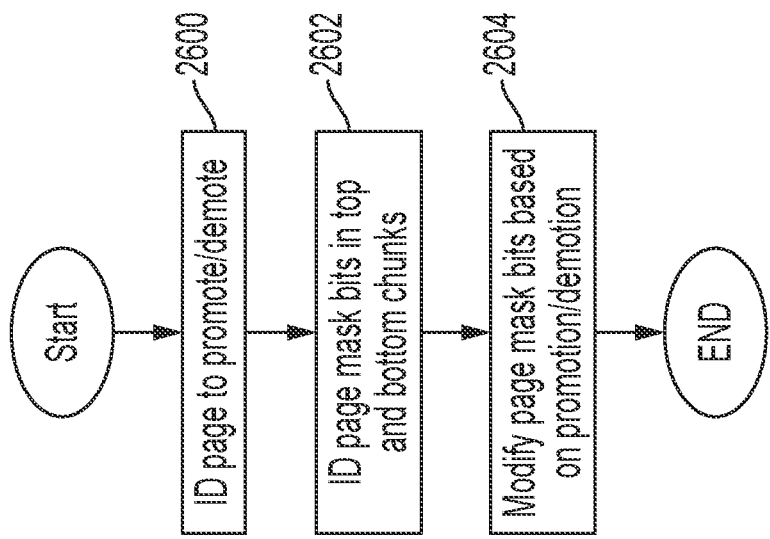
FIG. 29 depicts a flow diagram of a process for migrating pages from one tier to another according to one or more embodiments.

FIG. 29 depicts a flow diagram of a process for migrating pages from one tier to another according to one or more embodiments. The migration process may be triggered, for example, by a determination by the storage manager 124 that a number of pages in the top tier 1600 exceeds a maximum threshold number and should therefore be demoted to the low tier 1602. The migration process may also be triggered by a determination that a number of pages in the top tier 1600 is below a minimum threshold number, and that one or more pages from the low tier 1602 should be promoted to the top tier 1600.

The process starts, and in act 2600, the storage manager 124 identifies the pages to be promoted or demoted. For example, the storage manager 124 may identify a number of pages to be migrated based on a comparison against the threshold numbers. The pages to be demoted may be, for example, pages from a chunk at a tail of the top tier 1600 with the lowest chunk activity value. The pages to be promoted may be, for example, pages from a chunk at a head of the low tier 1602 with the highest chunk activity value.

In act 2602, the storage manager 124 identifies the bit of the page mask 1606 in the top tier chunk and in the bottom tier chunk that represent the page to the migrated.

In act 2604, the storage manager 124 modifies the identified bit of the page mask 1606 in the top tier chunk and in the bottom tier chunk. Using the example of FIG. 17, a page represented by mask bit 1608a in chunk 1604c in the top tier 1600 may be "moved" (e.g., demoted) to the low tier by changing the value of the mask bit 1608a to "0", and changing the value of the mask bit 1608b in the corresponding chunk 1604d in the low tier 1602 to "1." In another example, a page represented by mask bit 1610b in chunk 1604f in the low tier 1602 may be "moved" (e.g., promoted) to the top tier by changing the value of the mask bit 1610b to "0," and changing the value of the mask bit 1610a in the corresponding chunk 1604e in the top tier 1600 to "1."

In some embodiments, the benefits of tracking chunks that represent groupings of memory pages instead of representing individual pages via separate nodes, include: 1) a node is allocated for a chunk instead of physical nodes being allocated for each page, reducing space overhead; 2) because corresponding chunks are allocated in top and low tier, moving pages between tiers is a mere changing of a bit in the page mask, where if the page is moved from the low tier to the top tier, the page mask bit in the low tier is cleared and the page mask bit in the top tier is set; 3) merge sort may be used to rearrange chunks based on computed access percentages for the chunks; 4) computing chunk access percentages (0-100%) allow for warmness determination, providing more fine grained differentiation between two active chunks; 5) position of a chunk in the linked list implies access frequency since the position is based on access percentage computation and not a hot or cold (one or zero) determination; 6) corresponding chunks in the top and low tiers are connected, allowing the freeing of pages efficiently on a chunk basis in both the top and low tiers; 7) memory locality may be leveraged to group pages efficiently into a chunk, and make movement decisions for the group of pages in the chunk; and 8) chunk tracking requires no physical allocation for individual pages as the pages may be accessed using page offset values using a pointer to a start memory address.

One or more embodiments of the present disclosure may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for on-demand data storage management have been specifically described and illustrated herein, many modifications and variations will be apparent to those skilled in the art. Accordingly, it is to be understood that systems and methods for on-demand data storage management constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1: A storage system comprising: a first storage medium; a processor configured to communicate with the first storage medium; and a memory coupled to the processor, the memory storing instructions that, when executed by the processor, cause the processor to: identify a request to allocate memory in the first storage medium; in response to the request, represent the memory via at least a first node of a first data structure, wherein the first node stores first information for a first portion of the memory and a second portion of the memory; monitor a criterion for at least one of the first portion or the second portion; and update an order of the first node in the first data structure based on detecting the criterion.

Statement 2: The storage system of Statement 1, wherein the first portion includes a first page of memory, and the second portion includes a second page of memory.

Statement 3: The storage system of Statement 1, wherein the first portion of the memory is contiguous to the second portion of the memory, wherein the update of the order of the first node causes movement of the first portion of the memory and the second portion of the memory as a group.

Statement 4: The storage system of Statement 1, wherein the instructions that cause the processor to detect the criterion include instructions that cause the processor to detect access to the at least one of the first portion or the second portion of the memory.

Statement 5: The storage system of Statement 1, wherein the instructions that cause the processor to update the order of the first node include instructions that cause the processor to: compute a percentage of detections of the criterion; and determine a location of the first node in the first data structure based on the percentage.

Statement 6: The storage system of Statement 1, wherein the first data structure is associated with a first tier of a memory hierarchy, and the instructions further cause the processor to: in response to the request, represent the memory via a second node of a second data structure, wherein the second node stores second information for the first portion of the memory and the second portion of the memory, wherein the second data structure is associated with a second tier of the memory hierarchy.

Statement 7: The storage system of Statement 6, wherein the first information identifies whether the first portion of the memory and the second portion of the memory belong to the first tier, and the second information identifies whether the first portion of the memory and the second portion of the memory belong to the second tier.

Statement 8: The storage system of Statement 7, wherein the instructions further cause the processor to: identify, based on the first information or the second information, an association of the first portion with the first tier; determine a condition for changing the association for the first portion; and modify the first information and the second information to change the association for the first portion to the second tier.

Statement 9: The storage system of Statement 6, wherein the first node includes a link to the second node, wherein an update to the first information causes an update to the second information.

Statement 10: The storage system of Statement 1, wherein the instructions further cause the processor to: identify a first size for allocating the memory; identify a second size of the at least the first portion or the second portion; and determine a number of portions represented by the first node based on the first size and the second size, wherein a size of the first information is equal to the number of portions.

Statement 11: A method comprising: identifying a request to allocate memory in a first storage medium; in response to the request, representing the memory via at least a first node of a first data structure, wherein the first node stores first information for a first portion of the memory and a second portion of the memory; monitoring a criterion for at least one of the first portion or the second portion; and updating an order of the first node in the first data structure based on detecting the criterion.

Statement 12: The method of Statement 11, wherein the first portion includes a first page of memory, and the second portion includes a second page of memory.

Statement 13: The method of Statement 11, wherein the first portion of the memory is contiguous to the second portion of the memory, wherein the updating the order of the first node causes movement of the first portion of the memory and the second portion of the memory as a group.

Statement 14: The method of Statement 11, wherein the detecting of the criterion further includes detecting access to the at least one of the first portion or the second portion of the memory.

Statement 15: The method of Statement 11, wherein the updating the order of the first node includes: computing a percentage of detections of the criterion; and determining a location of the first node in the first data structure based on the percentage.

Statement 16: The method of Statement 11, wherein the first data structure is associated with a first tier of a memory hierarchy, and the method further comprises: in response to the request, representing the memory via a second node of a second data structure, wherein the second node stores second information for the first portion of the memory and the second portion of the memory, wherein the second data structure is associated with a second tier of the memory hierarchy.

Statement 17: The method of Statement 16, wherein the first information identifies whether the first portion of the memory and the second portion of the memory belong to the first tier, and the second information identifies whether the first portion of the memory and the second portion of the memory belong to the second tier.

Statement 18: The method of Statement 17 further comprising: identifying, based on the first information or the second information, an association of the first portion with the first tier; determining a condition for changing the association for the first portion; and modifying the first information and the second information to change the association for the first portion to the second tier.

Statement 19: The method of Statement 16, wherein the first node includes a link to the second node, wherein an update to the first information causes an update to the second information.

Statement 20: The method of Statement 11 further comprising: identifying a first size for allocating the memory; identifying a second size of the at least the first portion or the second portion; and determining a number of portions represented by the first node based on the first size and the second size, wherein a size of the first information is equal to the number of portions.

What is claimed is:
1. A storage system comprising:
a first storage medium;
a processor configured to communicate with the first storage medium; and
a memory coupled to the processor, the memory storing instructions that, when executed by the processor, cause the processor to:

identify a request to allocate memory in the first storage medium;

in response to the request, represent the memory via a first node of a first data structure and a second node of a second data structure, wherein the first node stores first information for a first portion of the memory and a second portion of the memory, and the second node stores second information for the first portion of the memory and the second portion of the memory;

monitor a criterion for at least one of the first portion or the second portion; and update an order of the first node in the first data structure based on detecting the criterion, wherein the instructions that cause the processor to update the order include instructions that cause the processor to alter a position of the first node in the first data structure relative to a position of a third node in the first data structure.

2. The storage system of claim 1, wherein the first portion includes a first page of memory, and the second portion includes a second page of memory.

3. The storage system of claim 1, wherein the first portion of the memory is contiguous to the second portion of the memory, wherein the update of the order of the first node causes movement of the first portion of the memory and the second portion of the memory as a group.

4. The storage system of claim 1, wherein the instructions that cause the processor to detect the criterion include instructions that cause the processor to detect access to the at least one of the first portion or the second portion of the memory.

5. The storage system of claim 1, wherein the instructions that cause the processor to update the order of the first node include instructions that cause the processor to:
compute a percentage of detections of the criterion; and
determine a location of the first node in the first data structure based on the percentage.

6. The storage system of claim 1, wherein the first data structure is associated with a first tier of a memory hierarchy, and the second data structure is associated with a second tier of the memory hierarchy.

7. The storage system of claim 6, wherein the first information identifies whether the first portion of the memory and the second portion of the memory belong to the first tier, and the second information identifies whether the first portion of the memory and the second portion of the memory belong to the second tier.

8. The storage system of claim 7, wherein the instructions further cause the processor to:
identify, based on the first information or the second information, an association of the first portion with the first tier;
determine a condition for changing the association for the first portion; and
modify the first information and the second information to change the association for the first portion to the second tier.

9. The storage system of claim 1, wherein the first node includes a link to the second node, wherein an update to the first information causes an update to the second information.

10. The storage system of claim 1, wherein the instructions further cause the processor to:
identify a first size for allocating the memory;
identify a second size of the at least the first portion or the second portion; and determine a number of portions represented by the first node based on the first size and the second size, wherein a size of the first information is equal to the number of portions.

11. A method comprising:
identifying a request to allocate memory in a first storage medium;
in response to the request, representing the memory via a first node of a first data structure and a second node of a second data structure, wherein the first node stores first information for a first portion of the memory and a second portion of the memory, and the second node stores second information for the first portion of the memory and the second portion of the memory
monitoring a criterion for at least one of the first portion or the second portion; and
updating an order of the first node in the first data structure based on detecting the criterion, wherein the updating of the order include altering a position of the first node in the first data structure relative to a position of a third node in the first data structure.

12. The method of claim 11, wherein the first portion includes a first page of memory, and the second portion includes a second page of memory.

13. The method of claim 11, wherein the first portion of the memory is contiguous to the second portion of the memory, wherein the updating the order of the first node causes movement of the first portion of the memory and the second portion of the memory as a group.

14. The method of claim 11, wherein the detecting of the criterion further includes detecting access to the at least one of the first portion or the second portion of the memory.

15. The method of claim 11, wherein the updating the order of the first node includes:
computing a percentage of detections of the criterion; and
determining a location of the first node in the first data structure based on the percentage.

16. The method of claim 11, wherein the first data structure is associated with a first tier of a memory hierarchy, and the second data structure is associated with a second tier of the memory hierarchy.

17. The method of claim 16, wherein the first information identifies whether the first portion of the memory and the second portion of the memory belong to the first tier, and the second information identifies whether the first portion of the memory and the second portion of the memory belong to the second tier.

18. The method of claim 17 further comprising:
identifying, based on the first information or the second information, an association of the first portion with the first tier;
determining a condition for changing the association for the first portion; and
modifying the first information and the second information to change the association for the first portion to the second tier.

19. The method of claim 11, wherein the first node includes a link to the second node, wherein an update to the first information causes an update to the second information.

20. The method of claim 11 further comprising:
identifying a first size for allocating the memory;
identifying a second size of the at least the first portion or the second portion; and
determining a number of portions represented by the first node based on the first size and the second size, wherein a size of the first information is equal to the number of portions.

* * * * *